(12) United States Patent
Davie

(10) Patent No.: US 10,320,671 B2
(45) Date of Patent: *Jun. 11, 2019

(54) EXTENSION OF LOGICAL NETWORKS ACROSS LAYER 3 VIRTUAL PRIVATE NETWORKS

(71) Applicant: Nicira, Inc., Palo Alto, CA (US)

(72) Inventor: Bruce Davie, Menlo Park, CA (US)

(73) Assignee: NICIRA, INC., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/082,975

(22) Filed: Mar. 28, 2016

(65) Prior Publication Data

US 2016/0212049 A1    Jul. 21, 2016

Related U.S. Application Data

(63) Continuation of application No. 13/843,738, filed on Mar. 15, 2013, now Pat. No. 9,331,938.

(Continued)

(51) Int. Cl.
*H04L 12/741* (2013.01)
*H04L 12/931* (2013.01)
(Continued)

(52) U.S. Cl.
CPC ........ *H04L 45/745* (2013.01); *H04L 12/4633* (2013.01); *H04L 12/4641* (2013.01);
(Continued)

(58) Field of Classification Search
CPC . G06F 9/45533; H04L 12/46; H04L 12/4641; H04L 41/0893; H04L 41/5096; H04L 45/16; H04L 63/00; H04L 45/745
See application file for complete search history.

(56) References Cited

U.S. PATENT DOCUMENTS

| 8,018,873 B1 | 9/2011 | Kompella |
| 2008/0240095 A1 | 10/2008 | Basturk |

(Continued)

FOREIGN PATENT DOCUMENTS

| WO | WO 2010/041996 | 4/2010 |
| WO | WO 2013/154813 | 10/2013 |

OTHER PUBLICATIONS

Extended European Search Report of EP16166244.0, dated May 19, 2016, Nicira, Inc.

(Continued)

*Primary Examiner* — Mansour Oveissi
(74) *Attorney, Agent, or Firm* — Adeli LLP

(57) ABSTRACT

A method of manages a set of managed forwarding elements that forward data between machines. The method configures (1) a first managed forwarding element to operate in a first network that uses first and second address spaces that at least partially overlap with each other, (2) a second managed forwarding element to operate in a second network that uses the first address space, and (3) a third managed forwarding element to operate in a third network that uses the second address space. A machine in the second network and a machine in the third network have an identical address that belongs to both the first and second address spaces. The method directs the first managed forwarding element to connect to the second and third managed forwarding elements in a manner that enables the first managed forwarding element to forward data from a machine in the first network to the machine in the second network via the second managed forwarding element.

24 Claims, 17 Drawing Sheets

Related U.S. Application Data

(60) Provisional application No. 61/623,828, filed on Apr. 13, 2012.

(51) Int. Cl.
  *H04L 12/46* (2006.01)
  *H04L 29/06* (2006.01)
  *H04L 12/24* (2006.01)

(52) U.S. Cl.
  CPC .......... *H04L 41/0803* (2013.01); *H04L 45/74* (2013.01); *H04L 49/70* (2013.01); *H04L 63/0272* (2013.01)

(56) References Cited

U.S. PATENT DOCUMENTS

| | | |
|---|---|---|
| 2010/0257263 A1 | 10/2010 | Casado et al. |
| 2011/0032843 A1 | 2/2011 | Papp et al. |
| 2012/0307828 A1* | 12/2012 | Agarwal .................. H04L 49/70 370/392 |
| 2013/0044636 A1* | 2/2013 | Koponen ................. H04L 47/12 370/254 |
| 2013/0044641 A1* | 2/2013 | Koponen ................. H04L 12/66 370/255 |
| 2013/0060940 A1* | 3/2013 | Koponen ............ H04L 12/4633 709/225 |
| 2013/0103834 A1 | 4/2013 | Dzerve et al. |
| 2013/0155845 A1 | 6/2013 | Patel et al. |
| 2013/0163475 A1 | 6/2013 | Beliveau et al. |

OTHER PUBLICATIONS

International Search Report and Written Opinion of PCT/US2013/033597, dated Aug. 30, 2013, Niciria, Inc.

International Preliminary Report on Patentability of PCT/US2013/033597, dated Oct. 23, 2014, Nicira, Inc.

\* cited by examiner

EXTENSION OF LOGICAL NETWORKS ACROSS LAYER 3 VIRTUAL PRIVATE NETWORKS

CLAIM OF BENEFIT TO PRIOR APPLICATIONS

This application is a continuation of U.S. patent application Ser. No. 13/843,738, filed Mar. 18, 2016. U.S. patent application Ser. No. 13/834,738 claims benefit to U.S. Provisional Patent Application 61/623,828, entitled "Extension of Virtual Networks across Layer 3 Virtual Private Networks", filed Apr. 13, 2012. U.S. Provisional Patent Application 61/623,828 and U.S. patent application Ser. No. 13/843,738, now published U.S. Publication 2013/0287026 are incorporated herein by reference.

BACKGROUND

Many current enterprises have large and sophisticated networks comprising switches, hubs, routers, servers, workstations and other networked devices, which support a variety of connections, applications and systems. The increased sophistication of computer networking, including virtual machine migration, dynamic workloads, multi-tenancy, and customer specific quality of service and security configurations requires a better paradigm for network control. Networks have traditionally been managed through low-level configuration of individual components. Network configurations often depend on the underlying network: for example, blocking a user's access with an access control list ("ACL") entry requires knowing the user's current IP address. More complicated tasks require more extensive network knowledge: forcing guest users' port 80 traffic to traverse an HTTP proxy requires knowing the current network topology and the location of each guest. This process is of increased difficulty where the network forwarding elements are shared across multiple users.

In response, there is a growing movement towards a new network control paradigm called Software-Defined Networking (SDN). In the SDN paradigm, a network controller, running on one or more servers in a network, controls, maintains, and implements control logic that governs the forwarding behavior of shared network forwarding elements on a per user basis. Making network management decisions often requires knowledge of the network state. To facilitate management decision-making, the network controller creates and maintains a view of the network state and provides an application programming interface upon which management applications may access a view of the network state.

Some of the primary goals of maintaining large networks (including both datacenters and enterprise networks) are scalability, mobility, and multi-tenancy. Many approaches taken to address one of these goals results in hampering at least one of the others. For instance, one can easily provide network mobility for virtual machines within an L2 domain, but L2 domains cannot scale to large sizes. Furthermore, retaining tenant isolation greatly complicates mobility. As such, improved solutions that can satisfy the scalability, mobility, and multi-tenancy goals are needed.

BRIEF SUMMARY

Some embodiments of the invention provide a network controller that generates configuration data for configuring a set of managed forwarding elements operating in several different network sites connected through a wide area network (WAN) such that the machines in the different sites can share the same address spaces.

One of the use cases for network virtualization is to connect a customer's data center across a WAN to a multi-tenant data center of a service provider (SP). The service provider's data center is virtualized using an overlay of tunnels that interconnect forwarding elements within the data center—typically, virtual switches running on computers hosting one or more virtual machines that run a top of a hypervisor. A dedicated forwarding element (referred to as a service node or pool node) is then used to forward packets from a tunnel within the provider's data center onto a tunnel that leads to the customer site. At the customer site, this tunnel is terminated on another forwarding element (referred to as a gateway or an extender), which forwards packets between the customer network and the tunnel.

In the current state of the art, the tunnel from the forwarding element in the SP data center to the forwarding element in the customer data center can be any sort of IP tunnel (GRE, IPsec, etc.) but the customer's IP address must be unique. That is, two different customers cannot use the same IP address for their extenders. In general, for the SP data center to be able to route packets over the tunnels to customers, each customer must have a public IP address on which the tunnel can terminate. This is a restriction that customers prefer to avoid.

Some embodiments of the invention use the capabilities of Layer 3 Virtual Private Networks (as described in RFC 2547 and RFC 4364) to extend a virtualized data center network across the WAN using only the customer's private addressing scheme. Layer 3 Virtual Private Networks (L3 VPNs) provide a means for the sites of a customer to be interconnected over a service provider's network. The customers of L3 VPN services can use any addresses they want; they are not required to have any public or globally unique addresses.

In the network control system of some embodiments, an L3 VPN service is implemented using Provider Edge (PE) routers, Provider (P) routers, and Customer Edge (CE) routers. PE routers hold a number of Virtual Routing and Forwarding tables (VRFs), each of which holds routing information for a particular customer. A VRF is attached to one or more interfaces of the PE, so that packets arriving on the interface(s) are forwarded using a routing table that is specific to the appropriate customer. Using this mechanism (which is fully described in RFC 4364), the network control system of some embodiments can forward packets across the service provider backbone to the correct customer location based on the customer's IP addressing plan.

The network control system of some embodiments performs two key operations to extend a virtualized data center network across the WAN while using a customer's private addressing scheme. First, as the system of some embodiments builds tunnels from a forwarding element (the service node) to a remote forwarding element (the extender) that has a non-unique address, the system uses some additional information (e.g. customer identifier) as well as the IP address of the tunnel endpoint to identify the remote switch. Second, the system of some embodiments maps the tunneled packets to the correct virtual interface to hit the correct VRF in the outbound direction, and maps the virtual interface to the correct customer context in the inbound direction.

Several problems arise when connecting a virtualized, multi-tenant data center network to an L3 VPN service. First, the service node device has to be able to build tunnels to IP addresses that are not unique, and to be able to differentiate among these tunnels when forwarding packets from a virtual network in the service provider data center to a customer site. In other words, the service node has to be aware of the address spaces of the customers, and should be able to relate these addresses to virtual networks in the data center. Second, the service node has to be able to forward packets to the correct VRF in the PE that sits at the edge of the WAN. This is necessary to ensure that packets are correctly forwarded across the L3 VPN to the appropriate customer site. The solutions for these problems are further described below.

One problem related to uniquely identifying tunnels is a naming problem. RFC 4364 solves the problem of how to uniquely represent non-unique addresses by prepending a customer-specific identifier (e.g., route distinguisher) to the (non-unique) customer addresses, in order to create VPN addresses that are globally unique. The network control system of some embodiments does a similar thing for tunnels that originate in the SP data center. This system names the tunnels by a customer ID and the IP address of the tunnel endpoint. This system also enhances the service node to recognize that when it forwards a packet from a virtual network inside the data center to the WAN, it must forward the packet to the tunnel that represents the correct location of the correct customer.

It is worth noting that there may be many virtual networks in the SP data center that map to the same customer tunnel. There may also be many tunnels for the same customer if that customer has many sites. In other words, one customer has a one-to-many relationship with the virtual networks in the SP data center. The network control system of some embodiments described herein enables the customer to have a one-to-many relationship by uniquely identifying the tunnel using some other information in addition to the IP address of the tunnel's endpoints.

The second problem is getting the packets into the correct VRF. The network control system of some embodiments addresses this problem by using one virtualized physical link between the service node and the PE device. Different embodiments use different techniques to virtualize the link. For example, the link could be an Ethernet link that supports VLAN tags, and each VLAN tag can represent a virtual interface on the PE. Another example would be that the service node connects to the PE over an IP network and builds a GRE tunnel to each VRF. These are standard methods to connect virtual interfaces to VRFs on a PE. However, it is novel that when the service node decides to forward a packet over a tunnel that leads to the WAN, the service node needs to send the packet on the appropriate virtual link (VLAN, GRE tunnel, etc.) as well as sending on the tunnel that leads all the way across the WAN. In some embodiments, several of these virtual interfaces link the service node to the PE, while there is only one physical link between the service node and the PE. The service node applies the correct virtual interface header (VLAN tag, GRE header) to ensure that the packets arrive at the correct VRF. Similarly, in the reverse direction, the PE puts the packets received from the WAN onto the correct virtual interface, which enables the service node to determine which customer network the tunnel is associated with.

As a packet moves from a service node in a multi-tenant data center to a remote extender in a customer site, packet headers are applied to and stripped from the packet. What is entering the pool node is a packet with a payload, which is just some data that needs to get out of the data center and off to the customer site. Typically, the packet will travel over a tunnel to reach the service node in the first place. The service node applies the tunnel header (which is addressed to the extender in the remote customer site) and then applies the Virtual Interface header to direct the packet to the correct VRF.

The packet has the Virtual IF header removed at the PE, and is looked up in the correct VRF. The VRF forwards the packet based on the IP address in the tunnel header. To convey this packet across the core of the L3 VPN, the PE applies MPLS headers using standard techniques. The egress PE removes the MPLS labels and sends the packet to a CE that forwards the packet on to the extender using normal IP forwarding. The extender then forwards the packet appropriately according to the same techniques that would be used when the extender has a public address.

Some embodiments perform the following operations to configure the system at the start before any packets flow: (1) The VPN is provisioned using standard techniques. This includes creating VRFs for the customer. (2) A virtual interface is configured on the PE and associated with the VRF. (3) The service node has to be configured with the mapping between the customer and virtual interface. (4) The service node and the extender need to learn each other's addresses so they can build the tunnel between them.

Once the system performs these four operations, the service node has everything it needs to map virtualized networks in the data center to the correct tunnels and virtual interfaces so that customer traffic can flow between the SP data center and the WAN.

In some embodiments, network controllers in a controller cluster control the extenders by configuring the extenders such that the extenders implement the virtualized network on the fly as the underlying physical network changes. In some embodiments, the controllers configure an extender at a customer site through a service node set up for the customer. Alternatively or conjunctively, the controllers in some embodiments configure the extender at the customer site using a daemon running in the extender. This daemon serves as a mechanism for the extender to communicate with the controller cluster. An example of such daemon is a proxy daemon running in the service node, acting as the controllers.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a network controller that generates configuration data for configuring a set of managed forwarding elements operating in several different network sites connected through a wide area network (WAN) such that the machines in the different sites can share the same address spaces. In some embodiments, managed forwarding elements are forwarding elements (e.g., software and hardware switches, software and hardware routers, etc.) that are managed (e.g., configured) by the network controllers. The managed forwarding elements are also referred to as managed switching elements in the present application.

The managed forwarding elements forward data (e.g., data frames, packets, etc.) in a managed network. In some embodiments, the managed forwarding elements fall into different categories based on the functionality of the managed forwarding elements. For instance, a managed forwarding element is an edge forwarding element when the managed forwarding element forwards data to and from machines that are sources and destinations of the data. A managed forwarding element is a pool node when the managed forwarding element does not directly interface with the machines that are sources and destinations of the data but facilitates data exchange between edge forwarding elements and/or forwarding elements that are remotely located (i.e., the forwarding elements that are in a site separated by a WAN from the site in which the pool node is located). The pool nodes and the edge forwarding elements are within the same managed network (e.g., a data center).

Moreover, a managed forwarding element is an extender when the managed forwarding element operates in another network and facilitates exchanges of data that originates from or is destined to the other network. The other network may be a network in a different geographical location, another managed network, an unmanaged network in the same data center, a network in a different network zone, etc. In some embodiments, the network system includes a managed forwarding element that is used as a communication gateway for communicating network data between the two networks. In some embodiments, the managed forwarding element is a part of the managed network while, in other embodiments, the managed forwarding element is part of the other network.

Pool nodes and extenders are also described in the U.S. Patent Publication No. 2013/0058250. In the present application, pool nodes and extenders are also referred to as service nodes and gateways, respectively.

Figure 1:
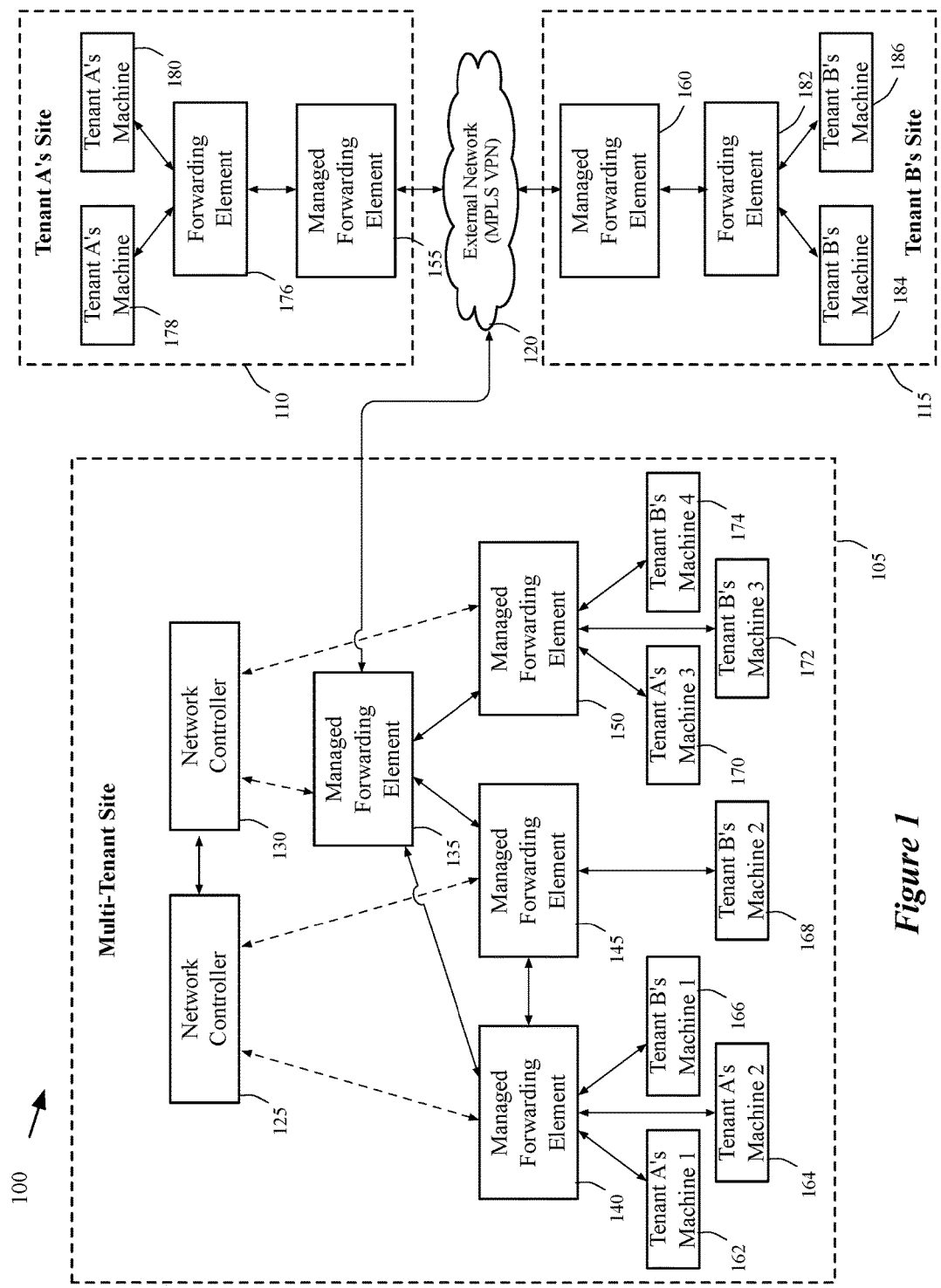
FIG. 1 illustrates network architecture of some embodiments.

FIG. 1 illustrates network architecture 100 of some embodiments. Specifically, this figure shows that machines of a particular tenant in a multi-tenant site and machines of the particular tenant in the particular tenant's private site share a particular address space. The particular address space of the particular tenant may completely or partially overlap with the address space of another tenant, who also has machines in the multi-tenant site. As shown, the network architecture 100 includes a multi-tenant site 105, two tenants' sites 110 and 115, and an external network 120.

The multi-tenant site 105 in some embodiments is a data center that serves several tenants. As shown, the multi-tenant site 105 has two network controllers 125 and 130, four managed forwarding elements 135-150, and seven tenant machines 162-174 for tenants A and B. The network controllers 125 and 130 manage the managed forwarding elements 135-150 by generating flow entries that define functionality of the managed forwarding elements and then sending the flow entries to the managed forwarding elements. In particular, the network controller 125 manages the managed forwarding elements 140 and 145, and the network controller 130 manages the managed forwarding elements 135 and 150.

The managed forwarding elements 140, 145, and 150 function as edge forwarding elements based on the flow entries received from the network controllers that manage these three managed forwarding elements. That is, the three managed forwarding elements directly interface with the tenant machines 162-174 of the tenants A and B to forward data to and from the tenant machines.

The managed forwarding element 135 functions as a pool node based on the flow entries received from the network controller 130. Specifically, the managed forwarding element 135 facilitates data exchange between the managed forwarding elements 140 and 145 and between the managed forwarding elements 145 and 150. Moreover, the managed forwarding element 135 sends out the data from the tenant A's machines in the multi-tenant site 105 to the tenant A's machines in the tenant A's site 110; and the data from the tenant B's machines in the multi-tenant site 105 to the tenant B's machines in the tenant B's site 115.

The tenant machines 162-174 are machines of the tenants A and B. The machines of the same tenant send and receive network data between each other over the network. The machines are referred to as network hosts and are each assigned a network layer host address (e.g., IP address). The machines may also be referred to as end systems because the machines are sources and destinations of data or endpoints of datapaths. In some embodiments, each of the machines can be a desktop computer, a laptop computer, a smartphone, a virtual machine (VM) running on a computing device, a terminal, or any other type of network host.

The tenant machines 162, 164, and 170 of the tenant A are in one address space (e.g., an IP prefix) and the tenant machines 166, 168, 172, and 174 are in another address space. In some embodiments, the network controller instances 125 and 130 configure the managed forwarding elements 135-150 in such a way that the tenant machines of the tenants A and B can have at least partially overlapping address spaces as will be described further below by reference to FIG. 2. The multi-tenant site 105 will also be described in more details further below by reference to FIG. 2.

The tenant A's site 110 of some embodiments is a private data center for the tenant A. As shown, the site 110 includes a managed forwarding element 155, a forwarding element 176, and two tenant A's machines 178 and 180. The managed forwarding element 155 functions as an extender and is managed by the network controller 130 via the managed forwarding element 135 in the multi-tenant site 105. That is, the managed forwarding element 155 receives flow entries generated by the network controller 130 from the managed forwarding element 135. The managed forwarding element 155 forwards data (1) to and from the managed forwarding element 135 in the multi-tenant site 105 and (2) to and from the forwarding element 176, which is not managed by the network controllers of the multi-tenant site 105. The forwarding element 176 is an edge forwarding element that interfaces with the machines 178 and 180 to forward data (1) to and from the machines 178 and 180 of the tenant A and (2) to and from the managed forwarding element 155. The machines 178 and 180 are in the same address space as the machines 162, 164, and 170 of the multi-tenant site 105.

The tenant B's site 115 is a private data center for the tenant B. As shown, the site 115 includes a managed forwarding element 160, a forwarding element 182, and two tenant B's machines 184 and 186. The managed forwarding element 160 functions as an extender configured by the network controller 130 via the managed forwarding element 135 in the multi-tenant site 105. The forwarding element 182 is not managed by the controller 130 and interfaces with the machines 184 and 186 of the tenant B, as shown. The machines 184 and 186 are in the same address space as the machines 166, 168, 172, and 174 of the multi-tenant site 105.

The external network 120 of some embodiments is used by the multi-tenant site 105 and the tenant sites 110 and 115 to communicate with each other. Specifically, the external network 125 utilizes Multiprotocol Label Switching (MPLS) Virtual Private Networks (VPNs) that enable the tenants machines of the tenant A in the tenant site 110 and the tenants machines of the tenant B in the tenant site 115 to have least partially overlapping address spaces. MPLS VPNs are described in detail in Rosen, et al.; "BGP/MPLS VPNs", Network Working Group, Informational RFC 2547, March 1999 (hereinafter, "RFC 2547"), available at http://www.ietf.org/rfc/rfc2547.txt; and Rosen, et al.; "BGP/MPLS IP Virtual Private Networks (VPNs)", Network Working Group, Standards Track RFC 4364, February 2006 (hereinafter, "RFC 4364"), available at http://www.ietf.org/rfc/rfc4364.txt. RFC 2547 and RFC 4364 are incorporated herein by reference.

One of the ordinary skill art will realize that the number of and the relationship between the network controllers, the managed forwarding elements, and the tenant machines in the multi-tenant sites and the tenant sites shown in this figure and the figures below are exemplary and other combinations of network controllers, managed forwarding elements, and tenant machines are possible.

Several more detailed embodiments are described below. First, Section I describes implementing the logical networks of some embodiments over several managed forwarding elements. Section II then describes extending the logical networks of some embodiments across layer 3 VPNs. Next, Section III describes configuring service nodes and remote gateways by network controllers to effectuate the extension of the logical networks. Section IV follows with a description of a use case. Finally, Section V describes an electronic system with which some embodiments of the invention are implemented.

I. Implementing Logical Networks

The following section will describe implementation of logical forwarding elements of a tenant in a multi-tenant site. In the present application, forwarding elements and machines may be referred to as network elements. In addition, a network that is managed by one or more network controllers may be referred to as a managed network in the present application. In some embodiments, the managed network includes only managed forwarding elements (e.g., forwarding elements that are controlled by one or more network controllers) while, in other embodiments, the managed network includes managed forwarding elements as well as unmanaged forwarding elements (e.g., forwarding elements that are not controlled by a network controller).

Figure 2:
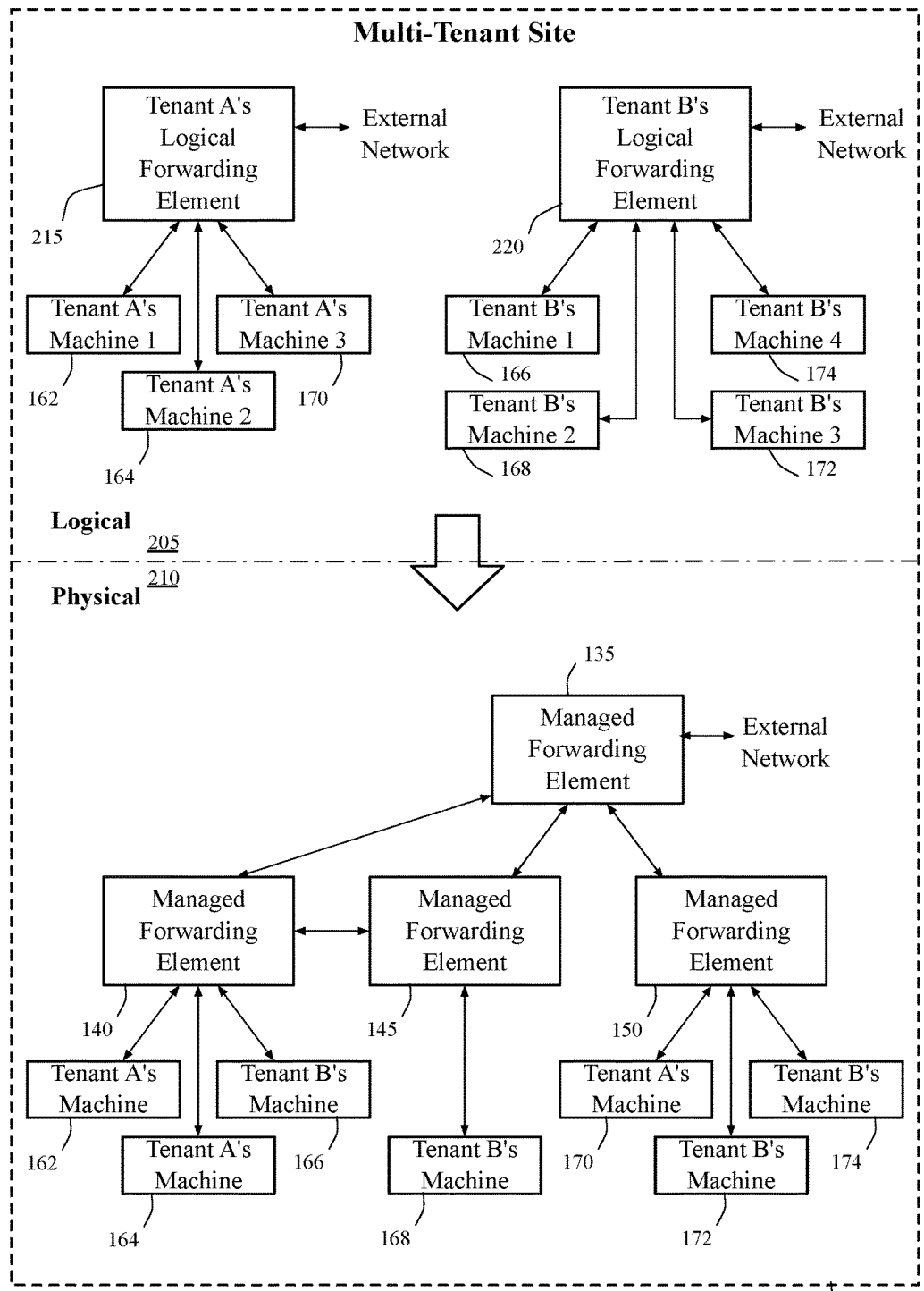
FIG. 2 illustrates a logical implementation and a physical implementation of a multi-tenant site.

FIG. 2 illustrates the multi-tenant site 105. Specifically, this figure illustrates a logical implementation 205 and a physical implementation 210 of the multi-tenant site 105. This figure is vertically divided into a top half and a bottom half that represent the logical and physical implementations 205 and 210, respectively.

The physical implementation 210 is the same as the multi-tenant site 105 illustrated in FIG. 1, except that the physical implementation 210 does not show the network controllers 125 and 130. The managed forwarding element 140 directly interfaces with the machines 162 and 164 of the tenant A and the machine 166 of the tenant B and forwards data to and from these three machines. More specifically, the managed forwarding element 140 of some embodiments is configured to use a managed port (not shown) of the managed forwarding element 140 for each of the machines 162-166 to exchange data with the machine through the managed port. The managed forwarding element 145 directly interfaces with the machine 168 of the tenant B and forwards data to and from the machine 168. The managed forwarding element 150 directly interfaces with the machine 170 of the tenant A and the machines 172 and 174 of the tenant B and forwards data to and from these three machines.

The managed forwarding element 135 exchanges data with the managed forwarding elements 140, 145, and 150 over the connections established between the managed forwarding elements. In some embodiments, these connections are tunnels that are defined using Generic Routing Encapsulation (GRE), IP Security (IPSec), Stateless Transport Tunneling (STT), or other tunneling protocols. In some embodiments, the managed forwarding elements are software forwarding elements that run in a host (e.g., a computing device, a server, etc.). The tunnels are established between the hosts that have software forwarding elements run in the host.

As mentioned above, the managed forwarding element 140 is a pool node that facilitates data exchange between the edge forwarding elements. For instance, when data sent by the machine 166 of the tenant B is destined to the machine 174 of the tenant B, the data is forwarded by the managed forwarding element 140, 135, and 150. This is because the managed forwarding element 140 and 150 that directly interface with the source and destination machines 166 and 174 do not have a connection established and thus need to use the connections to the pool node 135. In contrast, the pool node 135 does not get involved in forwarding data sent by the machine 166 to the machine 168 because the managed forwarding elements 140 and 145 that directly interface with the machines 166 and 168, respectively, have a connection established between them as shown. The pool node 135 also forwards data to and from the external network when the data is destined to or originates from the external network.

The logical implementation 205 shows that the multi-tenant site includes two logical forwarding elements 215 and 220 of the tenants A and B, respectively. The logical forwarding element 215 of the tenant A directly interfaces with the machines 162, 164, and 170 of the tenant A and forwards data to and from these three machines. That is, the logical forwarding element 215 is configured to use a logical port (not shown) of the logical forwarding element 215 for each of the machines 162, 164, and 170 to exchange data with the machine. The logical forwarding element 215 is also configured to use a logical port for the external network to send and receive data to and from the external network.

The network controllers 125 and 130 (not shown in this figure) configure the managed forwarding elements 135, 140, and 150 to implement the logical forwarding element 215 by mapping the logical ports of the logical forwarding element 215 to the managed ports of the managed forwarding elements 135, 140, and 150. Specifically, the logical port for the external network is mapped to the managed port for the external network of the managed forwarding element 135; the logical ports for the machines 162 and 164 are mapped to the managed ports for the machines 162 and 164, respectively, of the managed forwarding element 140; and the logical port for the machine 170 is mapped to the managed port for the machine 170 of the managed forwarding element 150. Similarly, the network controllers configure the managed forwarding elements 135, 140, 145, and 150 to implement the logical forwarding element 220 by mapping the logical ports of the logical forwarding element 220 to the managed ports of the managed forwarding elements 135, 140, 145, and 150. In such manner, the network controllers isolate the tenants A and B in the multi-tenant site 105 (i.e., the data for one tenant is not forwarded to the other tenant's machines), while the two tenants share the managed forwarding elements.

Figure 3:
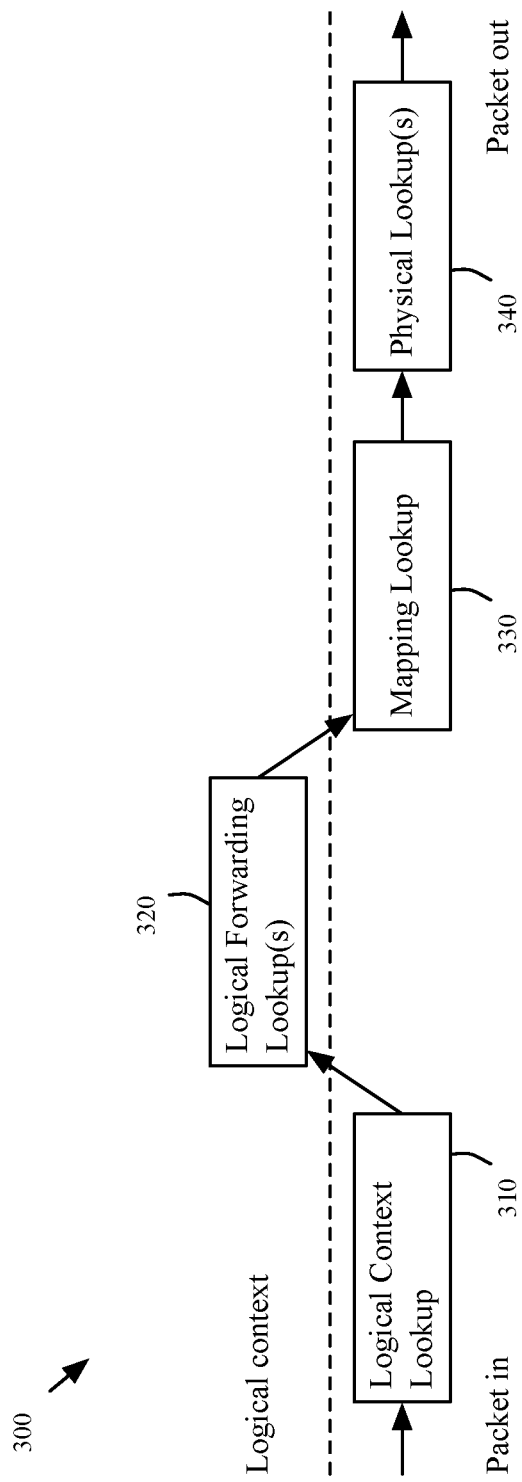
FIG. 3 conceptually illustrates a processing pipeline of some embodiments for processing network data through a logical forwarding element.

FIG. 3 conceptually illustrates a processing pipeline 300 of some embodiments for processing network data through a logical forwarding element. In particular, the processing pipeline 300 includes four stages 310-340 for processing a packet through a logical forwarding element that is implemented across a set of managed forwarding elements in a managed network. In some embodiments, each managed forwarding element in the managed network that receives the packet performs the processing pipeline 300 when the managed forwarding element receives the packet.

In some embodiments, a packet includes a header and a payload. The header includes, in some embodiments, a set of fields that contains information used for forwarding the packet through a network. Forwarding elements may determine forwarding decisions based on the information contained in the header and may, in some cases, modify some or all of the header fields. As explained above, some embodiments determine forwarding decisions based on flow entries in the forwarding elements' forwarding tables.

In some embodiments, the processing pipeline 300 may be implemented by flow entries in the managed forwarding elements in the network. For instance, some or all of the flow entries are defined such that the packet is processed against the flow entries based on the logical context tag in the packet's header. Therefore, in some of these embodiments, the managed forwarding elements are configured with such flow entries.

In the first stage 310 of the processing pipeline 300, a logical context lookup is performed on a packet to determine the logical context of the packet. In some embodiments, the first stage 310 is performed when the logical forwarding element receives the packet (e.g., the packet is initially received by a managed forwarding element in the network that implements the logical forwarding element).

In some embodiments, a logical context represents the state of the packet with respect to the logical forwarding element. For example, some embodiments of the logical context may specify the logical forwarding element to which the packet belongs, the logical port of the logical forwarding element through which the packet was received, the logical port of the logical forwarding element through which the packet is to be transmitted, the stage of the logical forwarding plane of the logical forwarding element the packet is at, etc. Referring to FIG. 2 as an example, the logical context of some embodiments for packets sent from tenant A's machines specify that the packets are to be processed according to the logical forwarding element 215, which is defined for the tenant A (rather than the logical forwarding element 220, which is defined for the tenant B).

Some embodiments determine the logical context of a packet based on the source MAC address (or IP address) of the packet (i.e., the machine from which the packet was sent). Some embodiments perform the logical context lookup based on the source MAC address of the packet and the physical inport (i.e., ingress port) of the packet (i.e., the port of the managed forwarding element through which the packet was received). Other embodiments may use other fields in the packet's header (e.g., MPLS header, VLAN id, etc.) for determining the logical context of the packet.

After the logical context of the packet is determined, some embodiments store the information that represents the determined logical context in one or more fields of the packet's header. These fields may also be referred to as logical context or a logical context tag or a logical context ID. Furthermore, the logical context tag may coincide with one or more known header fields (e.g., the VLAN id field) in some embodiments. As such, these embodiments do not utilize the known header field or its accompanying features in the manner that the header field is defined to be used.

In some embodiments when the first-hop managed forwarding element (i.e., the managed forwarding element that has the physical ingress port for the packet) determines the most of the logical context, not all of the information that represents the determined logical context is stored in the packet's header. In these embodiments, some information gets stored in registers of the first-hop managed forwarding element rather than in the fields of the packet's header and some information (e.g., determined logical egress port) is stored in the packet's header. Therefore, in such embodiments, non-first-hop managed forwarding elements performs only part (i.e., the third and fourth stages) of the processing pipeline 300.

In the second stage 320 of the processing pipeline 300, logical forwarding lookups are performed on the packets to determine where to route the packet based on the logical forwarding element (e.g., the logical port of the logical forwarding element through which to send the packet out) through which the packet is being processed. In some embodiments, the logical forwarding lookups include a logical ingress ACL lookup for determining access control when the logical forwarding element receives the packet, a logical L2 lookup for determining where to route the packet through a layer 2 network, and a logical egress ACL lookup for determining access control before the logical forwarding element routes the packet out of the logical forwarding element. Alternatively, or in conjunction with the logical L2 lookup, some embodiments of the logical forwarding lookups include a logical L3 lookup for determining where to route the packet through a layer three network. These logical lookups are performed based on the logical context tag of the packet in some of these embodiments.

In some embodiments, the result of the logical forwarding lookups may include dropping the packet, forwarding the packet to one or more logical egress ports of the logical forwarding element, or forwarding the packet to a dispatch port of the logical forwarding element. When the logical forwarding lookups determines that the packet is to be routed to the dispatch port of the logical forwarding element, some embodiments repeat the logical forwarding lookups until the packet is determined to be either dropped or forwarded to one or more logical egress ports.

Next, the third stage 330 of the processing pipeline 300 performs a mapping lookup on the packet. In some embodiments, the mapping lookup is a logical to physical mapping lookup that determines the physical port that corresponds to the logical egress port of the logical forwarding element. That is, the mapping lookup determines one or more ports of one or more managed forwarding elements that correspond to the logical egress port of the logical forwarding element through which the packet is to be sent out. For instance, if the packet is a broadcast packet or a multicast packet, the third stage 330 of some embodiments determines the ports of the managed forwarding elements that correspond to the logical egress ports of the logical forwarding element through which the packet is to be broadcasted or multicasted out (i.e., the logical ports to which the intended recipients of the packet is coupled). If the packet is a unicast packet, the third stage 330 determines a port of a managed forwarding element that corresponds to the logical egress port of the logical forwarding element through which the packet is to be sent out (i.e., the logical port to which the intended recipient of the packet is coupled). In some embodiments of the third stage 330, the mapping lookups are performed based on the logical context tag of the packet.

At the fourth stage 340 of the processing pipeline 300, a physical lookup is performed. The physical lookup of some embodiments determines operations for forwarding the packet to the physical port(s) that corresponds to the logical egress port(s) that was determined in the third stage 330. For example, the physical lookup of some embodiments determines one or more ports of the managed forwarding element on which the processing pipeline 300 is being performed through which to send the packet out in order for the packet to reach the physical port(s) determined in the third stage 330. This way, the managed forwarding elements can route the packet along the correct path in the network for the packet to reach the determined physical port(s) that corresponds to the logical egress port(s).

Some embodiments remove the logical context tag after the fourth stage 340 is completed in order to return the packet to its original state before the packet was processed by the processing pipeline 300.

As mentioned above, in some embodiments, the processing pipeline 300 is performed by each managed forwarding element in the managed network that is used to implement the logical forwarding element. In some embodiments, some of the managed forwarding elements perform only a portion of the processing pipeline 300. For example, in some embodiments, the managed forwarding element that initially receives the packet may perform the first-fourth stages 310-340 and the remaining managed forwarding elements that subsequently receive the packet only perform the first, third, and fourth stages 310, 330, and 340.

II. Extending Logical Networks

The following section will describe extending the logical networks defined for one or more tenants in a multi-tenant site across a WAN and into the tenants' private sites that may share overlapping address spaces.

Figure 4:
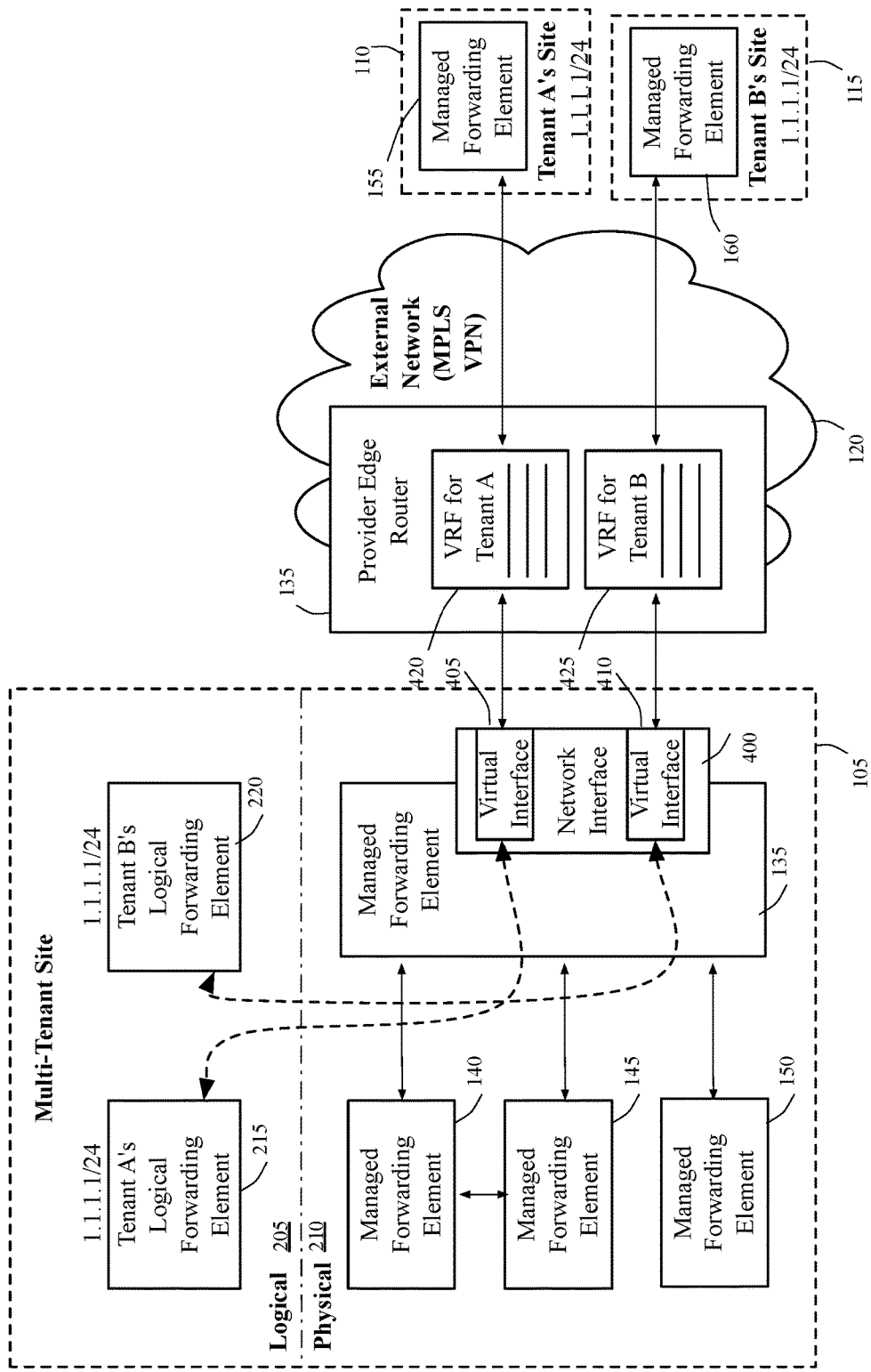
FIG. 4 illustrates connecting a pool node in a multi-tenant site to several extenders in several different tenant sites when the end systems in the tenant sites share the same address space.

FIG. 4 illustrates connecting a pool node in a multi-tenant site to several extenders in several different tenant sites when the end systems in the tenant sites share the same address space. This figure illustrates the multi-tenant site 105, the external network 120, and the tenant sites 110 and 115. As mentioned above, the network controllers 125 and 130 configure the managed forwarding elements to allow the machines of a particular tenant in the multi-tenant site 105 to use the same address space (e.g., the same IP prefix) as the machines of another tenant in the multi-tenant site while being isolated from the other tenant's machines. In addition, the machines in the particular tenant's private site may use addresses in the same address space as the particular tenant's machines in the multi-tenant site. Some embodiments use a VPN to connect the machines of the particular tenant that are in the multi-tenant site and the machines of the particular tenant that are in the tenant's private site so that all the machines of the particular tenant are in the same address space.

Several problems arise when the multi-tenant site is connected to the tenants' sites because the machines of different tenants may share the same address space. First, in some embodiments, the pool node in the multi-tenant site has to be able to establish VPN tunnels to addresses that are not unique. For instance, the extenders 155 and 160 may have identical IP prefixes even though the extenders are in different tenant sites because the tenant sites share the same address space. This problem is resolved by MPLS VPN described in above-incorporated RFC 4364. In order to make the addresses used by a tenant's site globally unique, the external network 120 of some embodiments that utilizes the MPLS VPN technology uses a tenant-specific identifier (e.g., a Route Distinguisher described in RFC 4364) and the IP addresses of the tunnel endpoints. This combination of the tenant-specific identifier and the IP addresses allows the pool node to distinguish between the extenders and establish a tunnel to an extender in the intended tenant site. As shown, the external network 120 includes a provider edge (PE) router 135, which includes two VPN Routing and Forwarding tables (VRFs) 420 and 425. The provider that maintains the external network 120 associates the VRFs 420 and 425 with the tenant-specific identifiers of the tenants A and B sites 110 and 115, respectively, so that the PE router can route the data to and from the sites 110 and 115.

Having resolved the first problem gives a rise to a second problem, which is connecting the pool node in the multi-tenant site to a correct VRF in the PE router interfacing with the multi-tenant site so that a particular tenant's data is forwarded to and from the end system in the particular tenant's site. The network controllers address this problem by establishing a virtualized physical link between the pool node and the PE router. Different embodiments use different techniques to virtualize the link. For instance, in some embodiments, the link is an Ethernet link that supports VLAN tags, and each VLAN tag can represent a virtual interface (VIF) to the PE router. In other embodiments, the network controllers configure the pool node to connect to the PE router over an IP network and to build a GRE tunnel to each VRF. As shown, the managed forwarding element 135, which is configured by the network controller to function as a pool node, creates the VIFs 405 and 410 in the physical network interface 400 to connect to the VRFs 420 and 425, respectively.

In some embodiments, the network controllers address this second problem without virtualizing the physical link between the pool node and the PE router. Instead, the network controllers configure the pool node to use one physical network interface per one VRF of the PE router to connect to the VRF.

As described above by reference to FIG. 2, the logical forwarding element 215 of the tenant A in the multi-tenant site 105 forwards data to and from the external network 120 through the logical port to the external network. The network controller 130 maps this logical port (not shown) to the VIF 405 so that the data from the machines 162, 145, and 170 can be forwarded to the machines 178 and 180 (not shown in this figure) in the tenant site 110, and vice versa. Similarly, the network controller 130 maps the logical port (not shown) for the external network of the logical forwarding element 220 to the VIF 410 so that the data from the machines 166, 168, 172, and 174 can be forwarded to the machines 184 and 186 in the tenant site 115 of the tenant B, and vice versa. The data exchange over the VIFs 405 and 410 are further described below by reference to FIG. 5 below.

Figure 5:
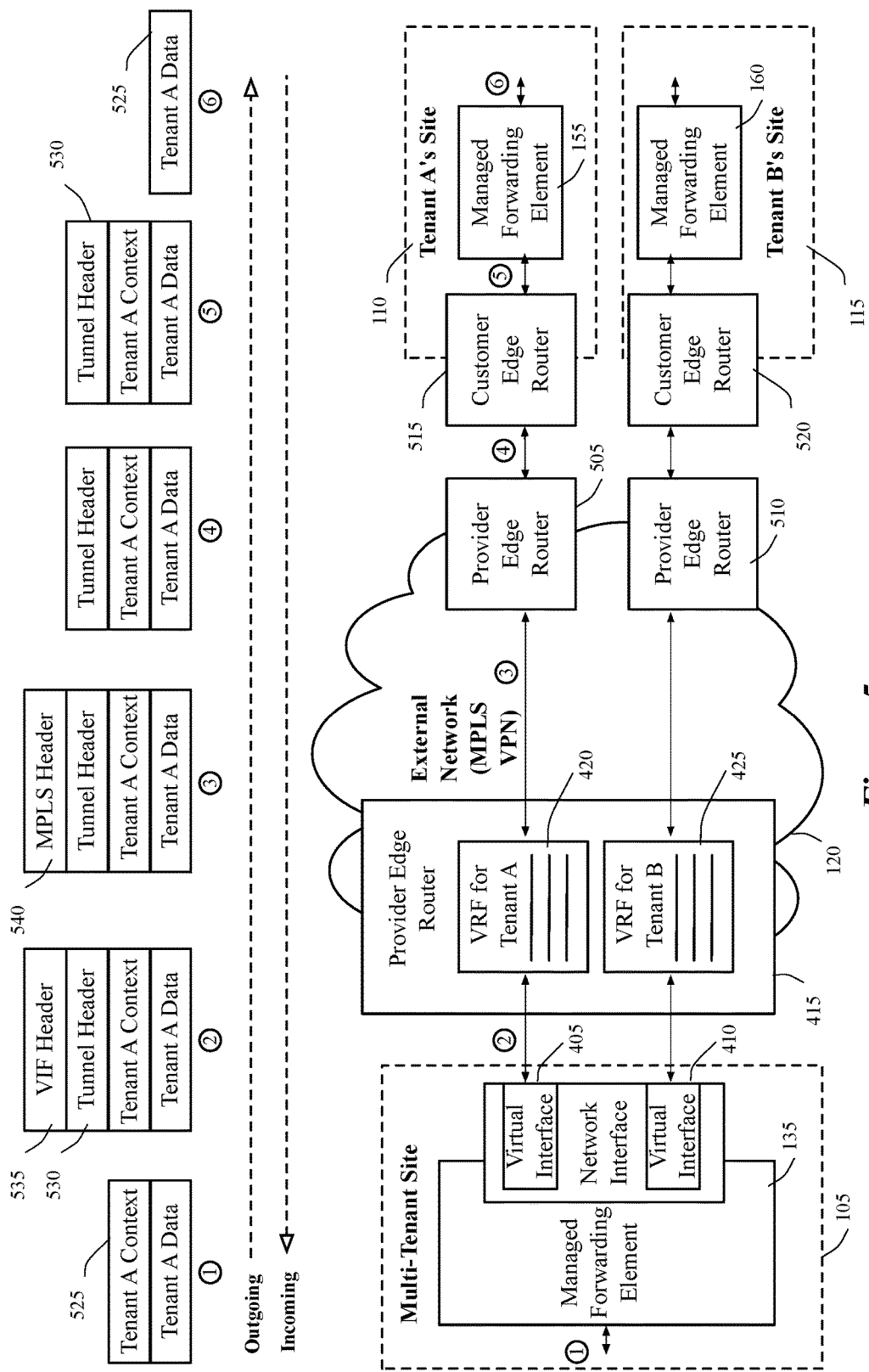
FIG. 5 illustrates how the data that originates from a machine of a particular tenant in the multi-tenant site of some embodiments is forwarded to a machine of the particular tenant in the particular tenant's site and vice versa.

FIG. 5 illustrates how the data that originates from a machine of a particular tenant in the multi-tenant site of some embodiments is forwarded to a machine of the particular tenant in the particular tenant's site and vice versa. Specifically, this figure illustrates data exchange between a machine (not shown) of the tenant A in the multi-tenant site 105 and a machine (not shown) of the tenant A in the tenant site 110 of the tenant A in both directions of the exchange. The both directions of this data exchange are referred to as outgoing and incoming directions based on the viewpoint of the multi-tenant site 105. That is, it is an outgoing direction when the data leaves the multi-tenant site 105 and it is an incoming direction when the data comes into the multi-tenant site 105. The bottom portion of this figure shows the multi-tenant site 105, the external network 120, and the two tenant sites 110 and 115. The top portion of this figure shows the data (e.g., a data packet) as the data is forwarded through different parts of the network. The different parts of the network are depicted using encircled numbers 1-6.

In addition to the PE router 415 that was illustrated in FIG. 4, the external network 120 illustrated in FIG. 5 includes PE routers 505 and 510 that interface with the tenant sites 110 and 115 of the tenants A an B, respectively. The VRFs in the PE routers 505 and 510 are not depicted in this figure for simplicity of the illustration. The tenant sites 110 and 115 in this figure have Customer Edge (CE) routers 515 and 520, respectively. CE routers are described in RFC 4364.

Forwarding of data (e.g., a data packet 525) for the tenant A in the outgoing direction will now be described. At the encircled 1, the managed forwarding element 135 receives the data packet 525. The data packet 525 is from a tenant A's machine (not shown) in the multi-tenant site 105 and is destined to a tenant A's machine (not shown) in the tenant A's site 110. The data packet 525 of some embodiments has header fields and the logical context. As mentioned above, the logical context of some embodiments for packets sent from tenant A's machines specify that the packets are to be processed according to the logical forwarding element 215 of the tenant A.

The managed forwarding element 135 looks at the logical context of the data packet 525 and determines that the data packet 525 belongs to the tenant A. The logical context of the packet 525 indicates that the logical egress port of the logical forwarding element 215 is for a machine of the tenant A that is in the tenant A's site 110. Based on this information, the managed forwarding element 135 maps this logical egress port to a port of the managed forwarding element 155 (the extender) at the tenant A's site 110. Therefore, the managed forwarding element 135 determines that the physical egress port of the managed forwarding element 135 for this packet is the VIF 405. Likewise, the physical egress port of the managed forwarding element 135 for a packet from any machine of the tenant A in the multi-tenant site 105 is the VIF 405 when the packet is destined to a tenant A's machine in the tenant A's site 110.

At the encircled 2, the managed forwarding element 135 then sends the data packet 525 out of the VIF 495 through a tunnel (e.g., an IPsec tunnel) established with the managed forwarding element 155, which functions as the extender at the tenant A's site 110. At this point, the data packet 525 has additional headers for the tunnel and the VIF. As shown, a tunnel header 530 encapsulates the packet 525 and the VIF header 535 encapsulates the tunnel header 530 and the packet 525. The VIF header includes an identifier for identifying the VIF 405, e.g., a VLAN tag or a GRE tunnel header, depending on the kind of VIF that the managed forwarding element 135 is configured to create.

The packet 525 then reaches the PE router 415. The PE router 415 looks at the VIF header 535 and determines that the VRF 420 for the tenant A should be used. At the encircled 3, the PE router 415 removes the VIF header 535 from the packet 525 because the VIF header 535 is only needed to get to the PE router 415. Being a PE router of a network that employs the MPLS VPN technology, the PE router 415 wraps the packet with an MPLS header 540. The MPLS header 540 directs the packet from one forwarding element to the next forwarding element based on short path labels rather than long network addresses, avoiding complex lookups and forwarding tables. These labels identify paths between the PE router 415 to the PE router 505 that interfaces with the tenant A's site 110. Accordingly, the packet 525 with the MPLS header 540 gets forwarded by the forwarding elements (not shown) in the external network 120 to the PE router 505.

At the encircled 4, the PE router 505 removes the MPLS header 540 from the packet 525 because the MPLS header 540 is useful for the packet to reach the PE router 505. The PE router 505 then forwards the packet to the CE router 515. At the encircled 5, the CE router 505 forwards the packet 525 to the managed forwarding element 155 using the address (e.g., IP address) specified in the tunnel header 530. This address is the address of the managed forwarding element 155 (or of the host in which the managed forwarding element 155 runs). At the encircled 6, the managed forwarding element 155, the extender, removes the tunnel header 530 and the logical context and forwards the packet towards the destination machine (not shown). At this point, the packet 525 still has other header(s) and will be forwarded based on the information included in the remaining headers.

Forwarding of data (e.g., a data packet 525) for the tenant A in the incoming direction will now be described. The packet 525 then has an address (an IP address) of a tenant A's machine as the destination address of the packet. At the encircled 6, the managed forwarding element 155 receives the packet from the tenant A's machine in the tenant A's site 110. At the encircled 6, the packet does not have the logical context yet. The managed forwarding element 155 as the extender identifies the logical context based on the information included in the header of the packet and attaches the logical context to the packet at the encircled 5. Also at the encircled 5, the managed forwarding element 155 wraps the packet 525 with the tunnel header 530 to send the packet to the pool node through the tunnel that terminates at the pool node. The tunnel header 530 of the packet being sent in the incoming direction has the address of the managed forwarding element 135 as the endpoint of the tunnel. At the encircled 4, the CE router 515 then forwards the packet to the PE router 505 according to the information included in the tunnel header 530.

The packet 525 reaches the PE router 505. At the encircled 3, the PE router 505 looks at the destination address of the tunnel header 535 and identifies the multi-tenant site 105 as the destination site because the destination address is of the multi-tenant site 105. The PE router 505 prepares the MPLS header 540 so as to send the packet to the PE router 415 because the PE router 415 interfaces with the destination site, the multi-tenant site 105. The PE router 505 then wraps the packet with the MPLS header 540. The packet 525 with the MPLS header 540 then gets forwarded by the forwarding elements (not shown) in the external network 120 to the PE router 415.

Once the packet reaches the PE router 415, the PE router 415 examines the MPLS header 540, which indicates that the packet has come from the tenant A's site 110. The PE router 415 identifies that the VRF 420 should be used because the VRF 420 is associated with the tenant A. The VRF 420 directs the PE router 415 to send the packet to the virtualized physical link to the multi-tenant site 105. At the encircled 2, the PE router 415 removes the MPLS header and attaches the VIF header 535 to send the packet to the multi-tenant site 105.

Once the packet reaches the PE router 415, the PE router 415 determines that the VRF 420 should be used, based on the examination of the MPLS header 540. The VRF 420 directs the PE router 415 to send the packet to the virtualized physical link to the multi-tenant site 105. At the encircled 2, the PE router 415 removes the MPLS header and attaches the VIF header 535 to send the packet to the multi-tenant site 105.

The managed forwarding element 135 receives the packet and identifies that the packet belongs to the tenant A because the packet comes through the VIF 405 and has tenant A's logical context. The managed forwarding element 135 also looks at the logical context of the packet and identifies the destination machine of the packet. At the encircled 1, the managed forwarding element 135 removes the VIF header 535 and the tunnel header 530 and sends the packet to the identified destination machine (not shown) of the packet.

It is to be noted that the VIF header 535 may not be needed by a packet in both directions of the data exchange between the machine of the tenant A in the multi-tenant site 105 and the machine of the tenant A in the tenant A's site 110 in some embodiments. In these embodiments, the managed forwarding element uses physical network interfaces instead of creating virtualized links over a single physical link to the PE router 415.

In some embodiments, the pool node in the multi-tenant site does not establish a tunnel to the extender in the tenant's site. In such embodiments, the PE router interfacing with the multi-tenant site looks at the logical context of the packet traveling in the outgoing direction and identifies the destination address of the packet from the logical context because the logical context of the packet in some embodiments includes the destination address. Therefore, the managed forwarding elements 135 and 155 do not wrap the packet with the tunnel header 530.

Moreover, there may be other headers or header fields that are attached to and removed from the packet 530 as the packet is forwarded in either of the outgoing and incoming directions (e.g., to send packets from one forwarding element to another forwarding element in the external network 120). These headers or header fields are not depicted in FIG. 5 for simplicity of illustration. Also, the headers that are depicted in this figure may get modified as the packet 530 travels in either direction but these modifications are not described nor depicted in the figure for simplicity of discussion and illustration.

Figure 6:
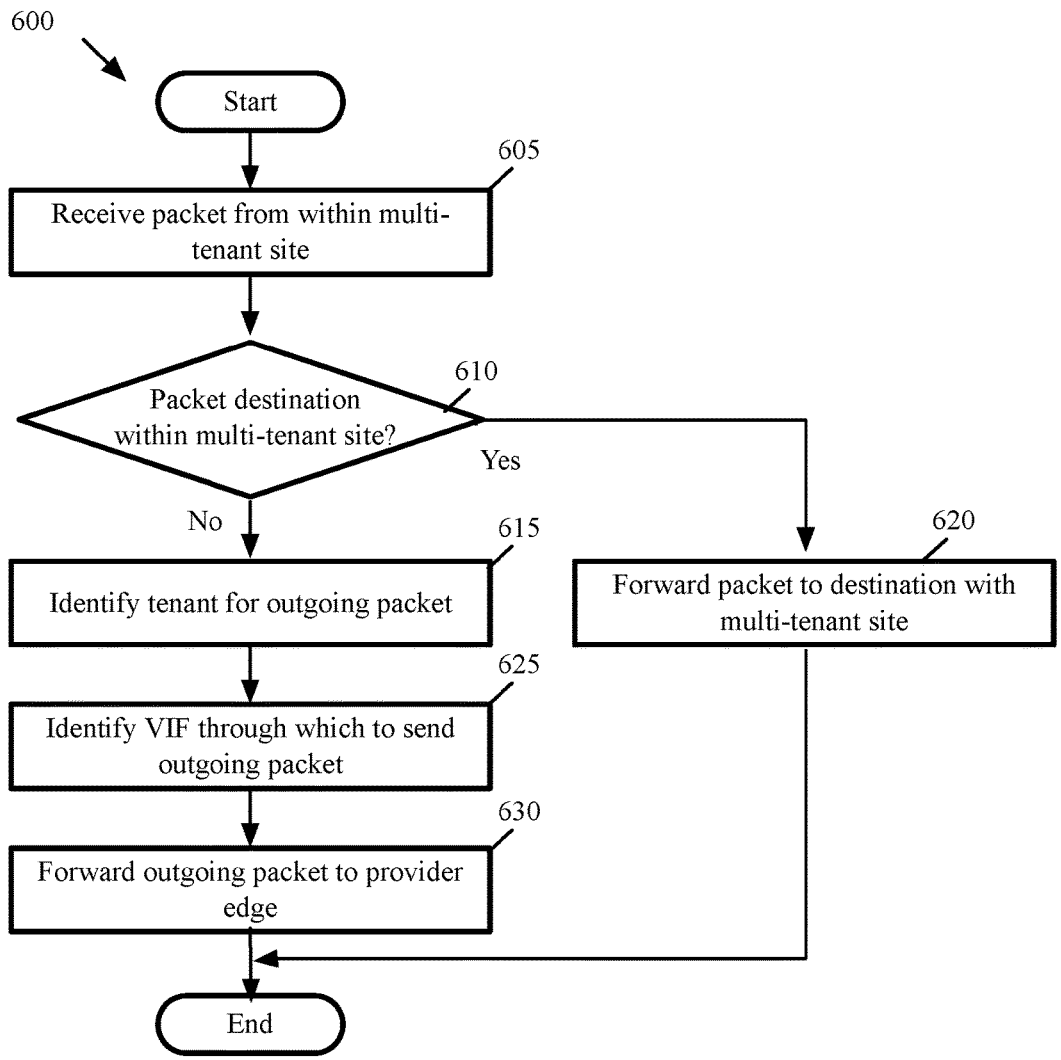
FIG. 6 conceptually illustrates a process that some embodiments perform to process a packet that exits a multi-tenant site.

FIG. 6 conceptually illustrates a process 600 that some embodiments perform to process a packet that exits a multi-tenant site. In some embodiments, the process 600 is performed by a pool node in the multi-tenant site (e.g., the managed forwarding element 135 described above by reference to FIG. 1).

The process 600 begins by receiving (at 605) a packet from within the multi-tenant site. For instance, the pool node may receive the packet from a managed forwarding element that is an edge forwarding element interfacing with the source machine of the packet. The packet as received at the pool node has a logical context that the edge forwarding element has identified and attached to the packet.

Next, the process 600 determines (at 610) whether the packet's destination is within the multi-tenant site. In some embodiments, the process 600 makes this determination based on the logical context of the packet because the logical context of the packet indicates the logical egress port of the logical forwarding element through which the packet should exit. The process 600 identifies the physical port to which the logical egress port is mapped. When the physical port is of a managed forwarding element that is within the multi-tenant site, the process 600 determines that the packet's destination is within the multi-tenant site. Otherwise, the process 600 determines that the packet's destination is not within the multi-tenant site.

When the process 600 determines (at 610) that the packet's destination is not within the multi-tenant site, the process 600 proceeds to 615, which will be described further below. Otherwise, the process 600 forwards (at 620) the packet towards the destination of the packet within the multi-tenant site.

When the process 600 determines (at 610) that the packet's destination is not within the multi-tenant site, the process 600 identifies (at 615) the tenant to which the packet belongs. In some embodiments, the process 600 identifies the tenant based on the logical context of the packet, which indicates the tenant for which the logical forwarding element forwards the packet.

The process 600 then identifies (at 625) a VIF through which to send the packet out to the PE router that interfaces with the multi-tenant site. As mentioned above, a VIF of the pool node is created to send a particular tenant's data to a particular VRF for the particular tenant in the PE router. Thus, the process 600 identifies the VIF through which to send the packet based on the identified (at 615) tenant.

Next, the process 600 forwards (at 630) the packet to the PE router through the identified (at 625) VIF. In some embodiments, the process 600 attaches a tunnel header to the packet to send the packet over the tunnel established between the pool node in the multi-tenant site and the extender in the remote site of the tenant. The process 600 also attaches the VIF header (e.g., a VLAN tag, a GRE tunnel header, etc.) to the outgoing packet. The process then ends.

Figure 7:
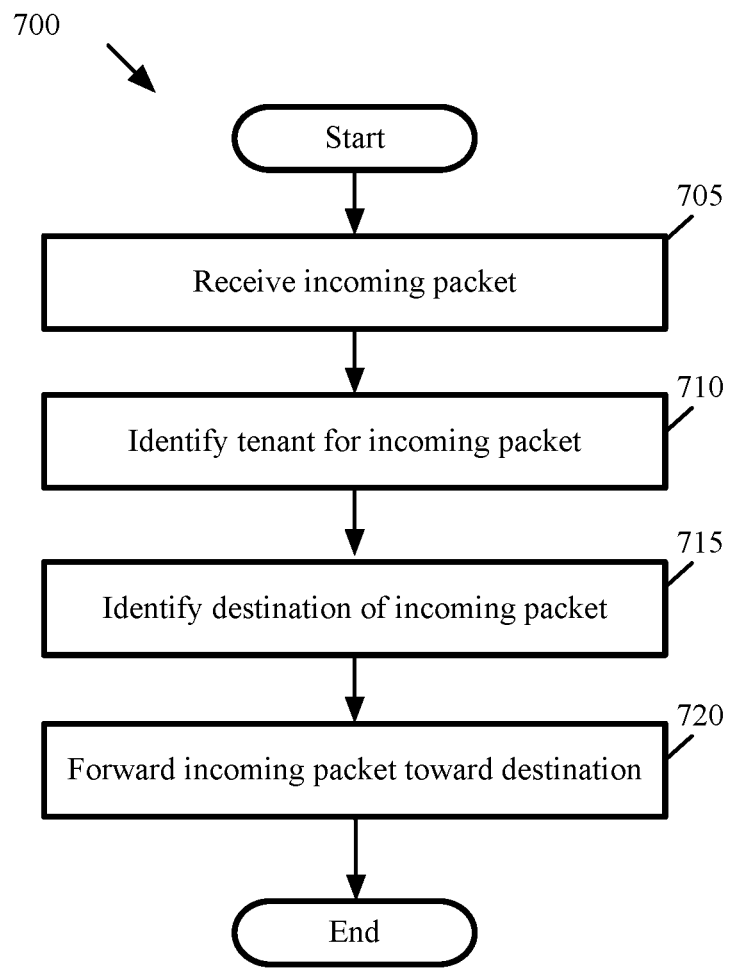
FIG. 7 conceptually illustrates a process that some embodiments perform to process a packet as the packet enters a multi-tenant site.

FIG. 7 conceptually illustrates a process 700 that some embodiments perform to process a packet as the packet enters a multi-tenant site. In some embodiments, the process 700 is performed by a pool node in the multi-tenant site (e.g., the managed forwarding element 135).

The process 700 begins by receiving (at 705) a packet from an external network. In some embodiments, the process 700 recognizes that the packet is an incoming packet when the packet is received through a virtual interface that the pool node has established to connect to a PE router that interfaces with the multi-tenant site.

Next, the process 700 identifies (at 710) a tenant to which the incoming packet belongs. In some cases, the packet has a logical context attached to the packet by the extender in the tenant's remote site. In these cases, the process 700 identifies the tenant based on the information included in the logical context after removing any additional encapsulations, such as the VIF header and the tunnel header for the tunnel between the pool node and the extender. In other situations, the process 700 identifies and attaches a logical context when the packet does not originate from the tenant's remote site. In these situations, the process 700 identifies the tenant based on the information included in the header of the packet.

The process 700 then identifies (at 715) the destination of the packet based on the logical context or the header of the packet. In some embodiments, the process 700 identifies the logical forwarding element of the identified (at 710) tenant and then identifies the logical egress port of the logical forwarding element. The process then identifies the physical port to which the identified logical egress port is mapped.

Next, the process 700 forwards (at 720) the packet towards the destination (i.e., the edge forwarding element that has the physical port to which the logical port is mapped). For instance, the process 700 may forward the packet to the edge forwarding element or another pool node. The process then ends.

Figure 8:
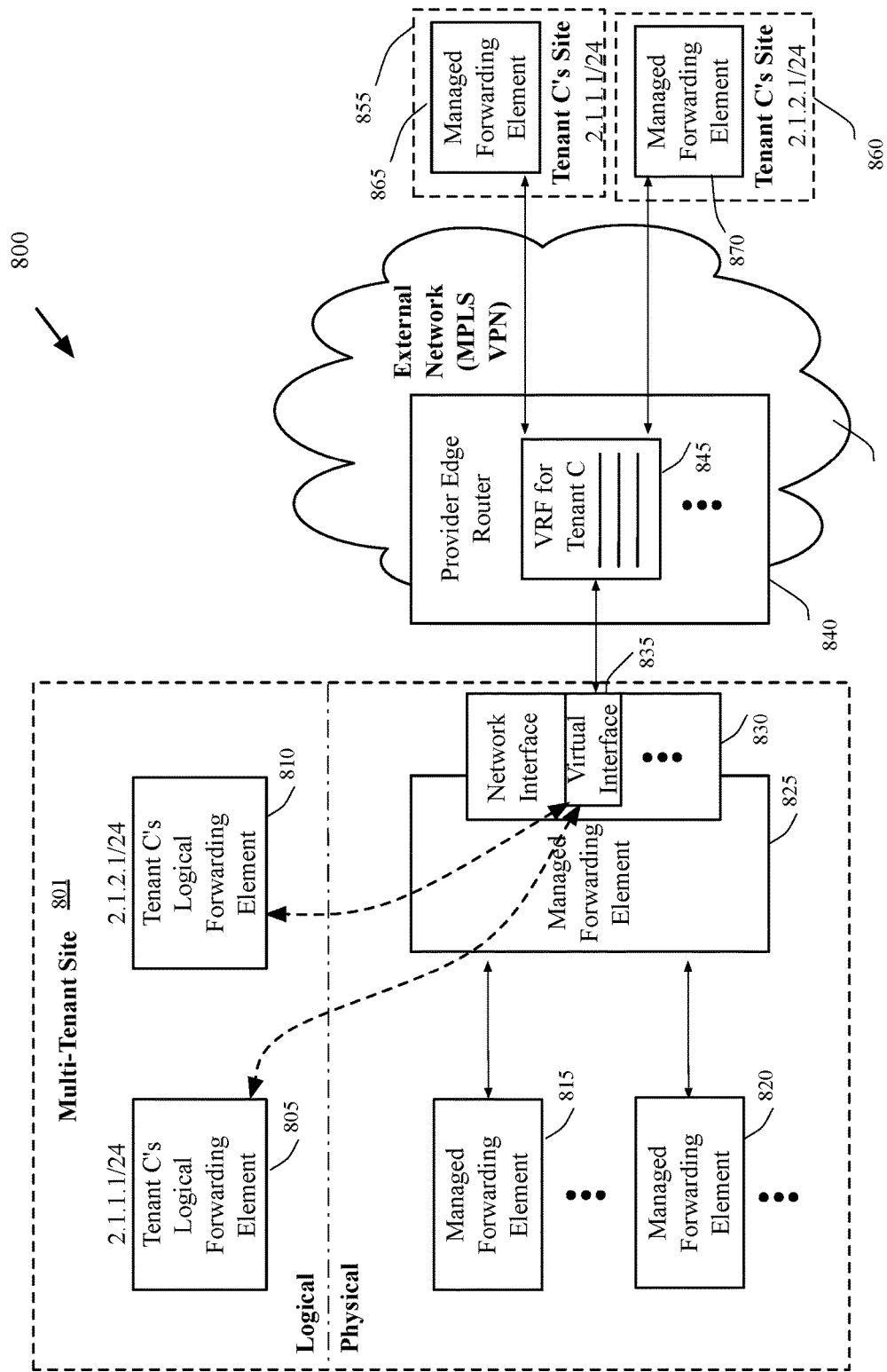
FIG. 8 illustrates a one-to-many relationship between a VRF for a particular tenant and the logical forwarding elements of the particular tenant in a multi-tenant site.

FIG. 8 illustrates network architecture 800 of some embodiments. Specifically, this figure illustrates a one-to-many relationship between a VRF for a particular tenant and the logical forwarding elements of the particular tenant in a multi-tenant site. This figure shows that managed forwarding elements of the multi-tenant site are configured to implement several logical forwarding elements for the particular tenant. The particular tenant has as many remote tenant sites as the number of the logical forwarding elements for the particular tenant. The address space for each logical forwarding element of the particular tenant at least partially overlaps with the address space of a remote site of the particular tenant. The pool node of the multi-tenant site connects each logical forwarding element to the remote site that has at least partially overlapping address space with the address space of the logical forwarding element. This figure illustrates a multi-tenant site 801, an external network 850, and two remote sites 855 and 860 of tenant C.

As shown, the multi-tenant site 801 includes managed forwarding elements 815, 820, and 825. The managed forwarding element 825 is configured to function as a pool node. The managed forwarding elements 815, 820, and 825 implement two logical forwarding elements 805 and 810. The machines of the tenant C with which the managed forwarding elements 815 and 820 directly interface are not depicted in this figure for simplicity of illustration.

The logical forwarding element 805 of the tenant C shares the same address space (e.g., an identical IP prefix) with the remote site 855 of the tenant C as shown. Likewise, the logical forwarding element 810 of the tenant C shares the same address space with the remote site 860 of the tenant C.

The network controller of some embodiments creates a VIF 835 in the physical network interface 830 for reaching a VRF 845 for the tenant C in a PE router 840 that interfaces with the multi-tenant site 801. The network controller maps a logical port of the logical forwarding element 805 for the external network 850 to the VIF 835 because the logical forwarding element 805 is of the tenant C and the VIF 835 connects to the VRF 845, which is for the tenant C. For the similar reason, the network controller maps a logical port of the logical forwarding element 810 for the external network 850 to the VIF 835.

The network controller also configures the managed forwarding element 825 to establish a tunnel to each of the remote sites 855 and 865 of the tenant C so that the tunnel headers for these tunnels can be used by the PE router 840 to forward data from either of the logical forwarding element of the user to the correct remote site of the tenant C.

When receiving an outgoing packet that originates from a machine of the tenant C that interfaces with the logical forwarding element 805, the managed forwarding element 825 wraps the packet with a tunnel header for the tunnel established between the pool node (the managed forwarding element 825) of the multi-tenant site 801 and the extender (the managed forwarding element 865) of the tenant C's site 855. This is because the logical forwarding element 805 and the tenant C's site 855 share the same address space as indicated by the IP prefixes 2.1.1.1/24.

For the similar reason, when receiving an outgoing packet that originates from a machine of the tenant C that interfaces with the logical forwarding element 810, the managed forwarding element 825 wraps the packet with a tunnel header for the tunnel established between the managed forwarding element 825 and a managed forwarding element 870 of the remote site 860. In this manner, the VIF 835, and thus the VRF 845 forms a one-to-many relationship with the logical forwarding elements 805 and 810 of the tenant C.

When an outgoing packet originating from a machine of the tenant C at the multi-tenant site 801 reaches the PE router 840, the PE router 840 looks up the VRF 845 using the address (e.g., an IP address) included in the tunnel header of the outgoing packet. The PE router 840 prepares the MPLS header to attach to the packet based on the address included in the tunnel header of the outgoing packet. The PE router 840 can identify one of the remote sites 865 and 860 as the destination site based on the address included in the tunnel header. The PE router 840 attaches an MPLS header to the packet so that the forwarding elements (not shown) in the external network 850 that employs the MPLS VPN technology to forward the packet to a PE router (not shown) that interfaces with the intended remote site of the tenant C.

Conversely, when the incoming packet originating from a machine in either of the remote sites 855 and 860 of the tenant C reaches the managed forwarding element 825 through the VIF 835, the managed forwarding element 825 identifies the intended logical forwarding element of the tenant C in the multi-tenant site 801 using the tunnel header. This is because this tunnel header identifies the tenant site of C that the packet came from.

Figure 9:
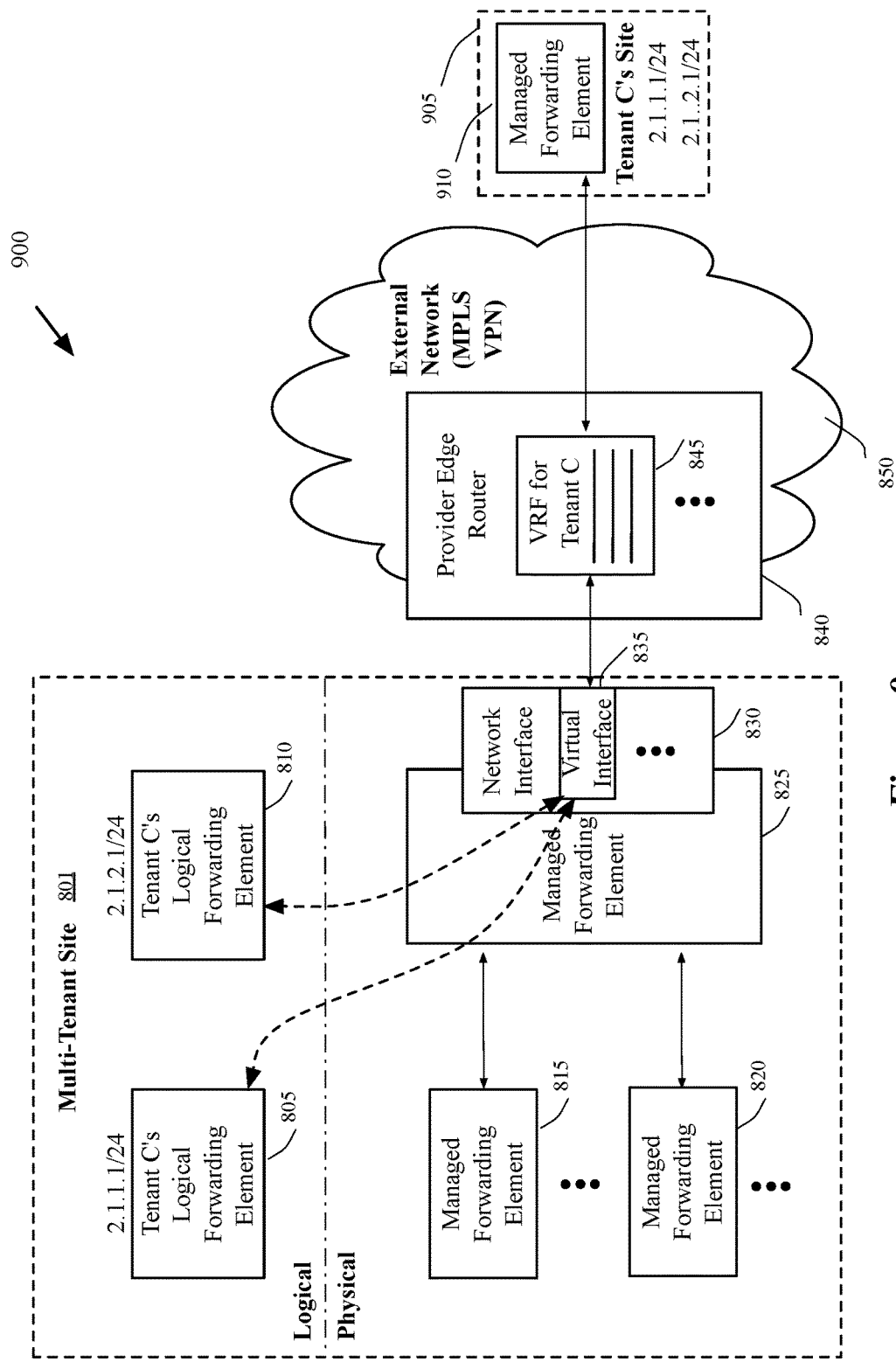
FIG. 9 illustrates network architecture of some embodiments.

FIG. 9 illustrates network architecture 900 of some embodiments. The network architecture 900 is similar to the network architecture 800 described above by reference to FIG. 8 in that the network architecture 900 includes the multi-tenant site 801 and the external network 850. However, in contrast to the network architecture 800, the network architecture 900 shows that the tenant C has only one remote site 905.

As shown, in some embodiments, the remote site 905 of the tenant C has two address spaces (e.g., two IP prefixes 2.1.1.1/24 and 2.1.2.1/24) that the logical forwarding elements 805 and 810 in the multi-tenant site 801 also have. The relationship between the VRF 845 in the PE router 840 and the logical forwarding elements is still one-to-many. However, because there is only one site of tenant C on the other side of the network and thus there is only one tunnel, the tunnel header does not provide much information to distinguish between the data traffic to and from the logical forwarding elements 805 and 810.

For an incoming packet originating from a machine (not shown) in the remote site 905, the managed forwarding element 910 that is configured to function as an extender in the tenant C's site 905 identifies and attaches a logical context to the incoming packet. The managed forwarding element 910 of some embodiments specifies in the logical context an identifier (e.g., a VLAN tag) for specifying which of the logical forwarding elements in the multi-tenant site 801 should handle the packet when the packet reaches the multi-tenant site. When the packet reaches the managed forwarding element 825, which is the pool node in the multi-tenant site 801, the managed forwarding element 825 identifies the logical forwarding element to which to send the packet using the identifier in the logical context of the packet.

Figure 10:
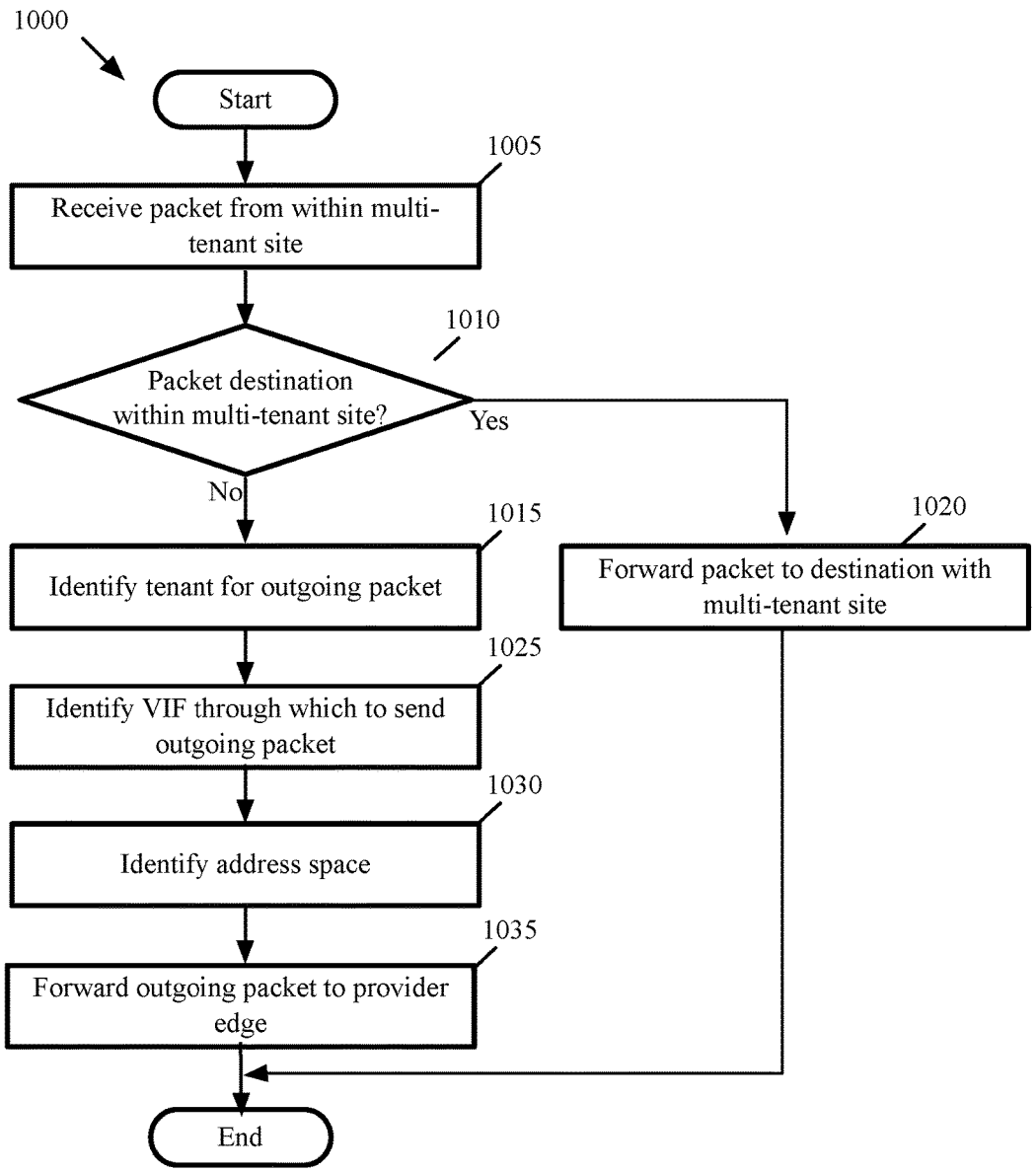
FIG. 10 conceptually illustrates a process that some embodiments perform to process a packet that exits a multi-tenant site.

FIG. 10 conceptually illustrates a process 1000 that some embodiments perform to process a packet that exits a multi-tenant site. The multi-tenant site in some embodiments includes several managed forwarding elements, which implement several logical forwarding elements of a particular tenant. A particular tenant has one or more remote sites that include possible destinations of the outgoing packet. In some embodiments, the process 1000 is performed by a pool node of the multi-tenant site (e.g., the managed forwarding element 825). As shown, the process 1000 is similar to the process 600 described above by reference to FIG. 10, except that the process 1000 additionally performs operation 1030 for identifying the address space of the tenant.

The process 1000 begins by receiving (at 1005) a packet from within the multi-tenant site. For instance, the packet may come from a managed forwarding element that is an edge forwarding element interfacing with the source machine of the packet. The packet has a logical context that the edge forwarding element has identified and attached to the packet. The logical context indicates that the packet should exit the multi-tenant site through a logical port (of the logical forwarding element) for the external network.

Next, the process 1000 determines (at 1010) whether the packet's destination is within the multi-tenant site. In some embodiments, the process 1000 looks at the logical context and makes this determination based on the logical context of the packet because the logical context of the packet indicates the logical egress port of the logical forwarding element through which the packet should exit. The process 1000 identifies the physical port to which the logical egress port is mapped. When the physical port is of a managed forwarding element that is within the multi-tenant site, the process 1000 determines that the packet's destination is within the multi-tenant site. Otherwise, the process 1000 determines that the packet's destination is not within the multi-tenant site.

When the process 1000 determines (at 1010) that the packet's destination is not within the multi-tenant site, the process 1000 proceeds to 1015, which will be described further below. Otherwise, the process 1000 forwards (at 1020) the packet towards the destination of the packet within the multi-tenant site.

When the process 1000 determines (at 1010) that the packet's destination is not within the multi-tenant site, the process 1000 identifies (at 1015) the tenant to which the packet belongs. In some embodiments, the process 1000 identifies the tenant based on the logical context of the packet, which indicates the tenant for which the logical forwarding element forwards the packet.

The process 1000 then identifies (at 1025) a VIF through which to send the packet out to the PE router that interfaces with the multi-tenant site. As mentioned above, a VIF of the pool node is created to send a particular tenant's data to a particular VRF for the particular tenant in the PE router. Thus, the process 1000 identifies the VIF through which to send the packet based on the identified (at 1015) tenant.

Next, the process 1000 identifies (at 1030) the address space to which the source machine of the packet belongs. In some embodiments, the process 1000 identifies the address space using the logical context of the packet, which indicates the address space (e.g., an IP prefix) to which the packet's source machine belongs. For some embodiments in which the identified (at 1015) tenant has more than one remote site, the process 1000 uses the identification of the address space (i.e., the identification of logical forwarding element that handles the addresses in the address space) to identify and attach a proper tunnel header to send the packet to the intended remote site of the tenant.

In other embodiments in which the identified (at 1015) tenant has one remote site sharing the address spaces with all of the logical forwarding elements of the tenant in the multi-tenant site, the process 1000 puts the identification of the address space (e.g., a VLAN tag) of the tenant in the logical context of the packet so that the PE router interfacing with the multi-tenant site can identify the intended remote site of the tenant based on the identification of the address space included in the logical context.

The process 1000 then forwards (at 1035) the packet to the PE router through the identified (at 1020) VIF. In some embodiments, the process 1000 attaches a tunnel header to the packet to send the packet over the tunnel established between the pool node in the multi-tenant site and the extender in the remote site of the tenant. The process 1000 also attaches the VIF header to the outgoing packet. The process then ends.

Figure 11:
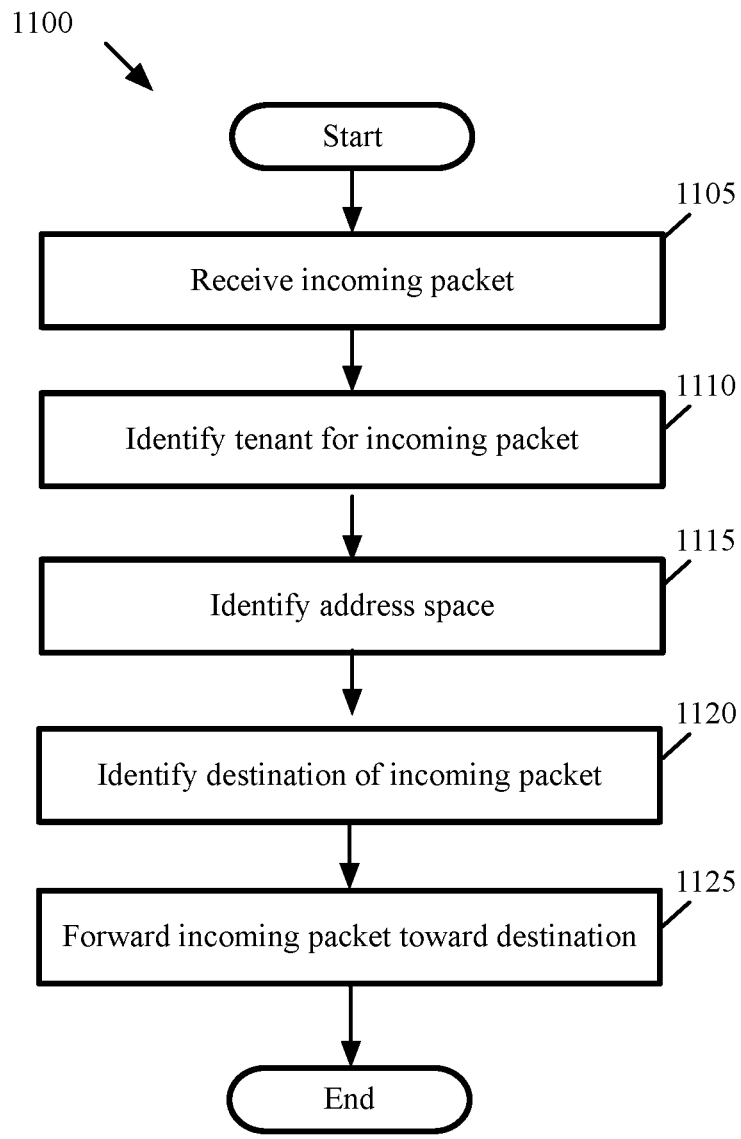
FIG. 11 conceptually illustrates a process that some embodiments perform to process a packet that enters a multi-tenant site.

FIG. 11 conceptually illustrates a process 1100 that some embodiments perform to process a packet that enters a multi-tenant site. The multi-tenant site in some embodiments includes several managed forwarding elements, which implement several logical forwarding elements of a particular tenant. A particular tenant has one or more remote sites that include possible sources of the incoming packet. In some embodiments, the process 1100 is performed by a pool node in the multi-tenant site (e.g., the managed forwarding element 825 of FIG. 8). As shown, the process 1100 is similar to the process 700 described above by reference to FIG. 7, except that the process 1100 performs an extra operation 1115 for identifying the address space of the tenant.

The process 1100 begins by receiving (at 1105) a packet from an external network. In some embodiments, the process 1100 recognizes that the packet is an incoming packet when the packet is received through a virtual interface that the pool node has established to connect to a PE router that interfaces with the multi-tenant site.

Next, the process 1100 identifies (at 1110) a tenant to which the incoming packet belongs. In some cases, the packet has a logical context attached to the packet by the extender in the tenant's remote site from which the packet originates. In these cases, the process 1100 identifies the tenant based on the information included in the logical context after removing any additional encapsulations, such as the VIF header and the tunnel header for the tunnel between the pool node and the extender. In other situations, the process 1100 identifies and attaches a logical context when the packet does not originate from the tenant's remote site. In these situations, the process 1100 identifies the tenant based on the information included in the header of the packet.

The process 1100 then identifies (at 1115) the address space to which the source machine of the packet belongs based on the logical context. As mentioned above, for some embodiments in which a tenant has more than one remote site, the extender at the remote site from which the packet originates wraps the packet with a tunnel header for the tunnel established between the extender and the pool node. The process 1100 in these embodiments identifies the address space based on the tunnel header. For those embodiments in which the tenant has a single remote site that shares the address spaces with all of the logical forwarding elements of the tenant in the multi-tenant site, the extender specifies an identifier (e.g., a VLAN tag) in the logical context of the packet for identifying the address space to which the destination machine belongs. In these embodiments, the process 1100 identifies the address space based on the identifier included in the logical context.

The process 1100 then identifies (at 1120) the destination of the packet based on the logical context or the header of the packet. In some embodiments, the process 1100 identifies the logical egress port of the identified (at 1100) logical forwarding element. The process then identifies the physical port to which the identified logical egress port is mapped.

Next, the process 1100 forwards (at 1125) the packet towards the destination (i.e., the edge forwarding element that has the physical port to which the logical port is mapped). For instance, the process 1100 may forward the packet to the edge forwarding element or another pool node. The process then ends.

III. Configuring Service Nodes and Gateways

The following section will describe network controllers that configure service nodes and remote extenders to effectuate the extension of logical networks in a multi-tenant site into tenants' private sites that are remote to the multi-tenant site.

A. Sending Configuration Data

Figure 12:
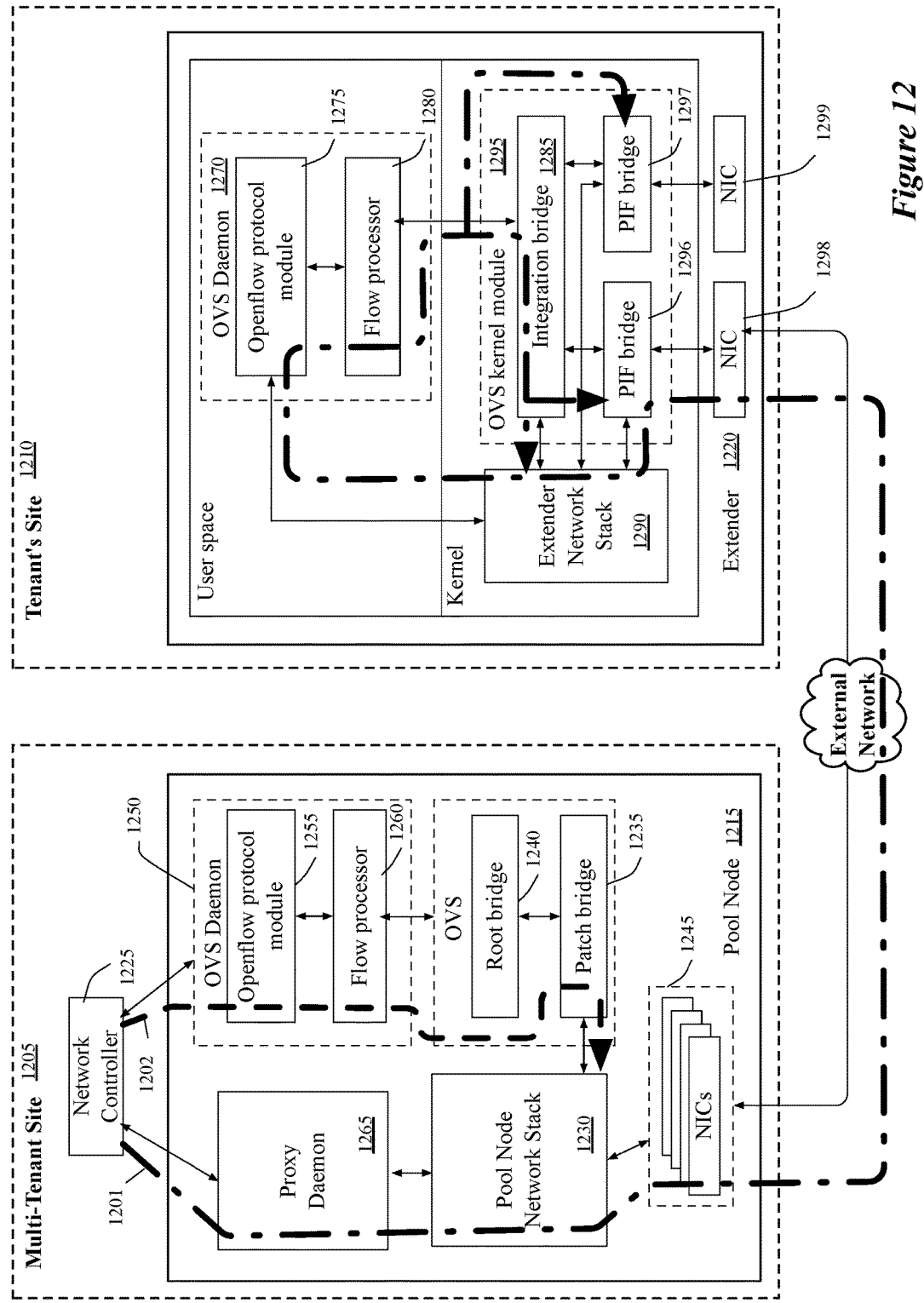
FIG. 12 illustrates an architectural diagram of a pool node in a multi-tenant site and an extender in a remote site of a tenant.

FIG. 12 illustrates an architectural diagram of a pool node in a multi-tenant site and an extender in a remote site of a tenant. Specifically, this figure illustrates that a network controller in the multi-tenant site configures both the pool node and the extender by generating configuration data and sending the configuration data to the pool node and to the extender. In some embodiments, the network controller sends the configuration data to configure the extender via the pool node so that the network controller does not have to expose the network address (e.g., an IP address) of the network controller to the extender in the remote site.

This figure illustrates a multi-tenant site 1205 and a remote site 1210 of a tenant. As shown, the multi-tenant site 1205 includes a network controller 1225 and a pool node 1215. The remote site 1210 includes an extender 1220. This figure also illustrates arrow-headed lines 1201 and 1202, which conceptually indicates the paths of the configuration commands/data traversing from the network controller 1225 to inside of the extender 1220 and inside of the pool node 1215, respectively.

The pool node 1215 includes an Open vSwitch (OVS) daemon 1250, a proxy daemon 1265, a pool node network stack 1230, the root bridge 1240, patch bridge 1235, and a set of NICs 1245. The OVS daemon 1250 is also an application that runs in the pool node. The OVS daemon 1250 of some embodiments communicates with a network controller 1225 in order to process and forward packets that the pool node 1215 receives. For example, the OVS daemon 1250 receives commands from the network controller 1225 regarding operations for processing and forwarding packets that the pool node 1215 receives. The OVS daemon 1250 of some embodiments communicates with the network controller 1225 through the OpenFlow protocol. The OpenFlow protocol is a communication protocol for controlling the forwarding plane (e.g., forwarding tables) of a forwarding element. For instance, the OpenFlow protocol provides commands for adding flow entries to, removing flow entries from, and modifying flow entries in the forwarding element. In some embodiments, another type of communication protocol is used.

As shown, the OVS daemon 1250 includes an OpenFlow protocol module 1255 and a flow processor 1260. The OpenFlow protocol module 1255 communicates with the network controller 1225 through the OpenFlow protocol. For example, the OpenFlow protocol module 1255 receives configuration information from the network controller 1225 for configuring the pool node 1215. Configuration information may include flows that specify rules (e.g. flow entries) for processing and forwarding packets. When the OpenFlow protocol module 1255 receives configuration information from the network controller 1225, the OpenFlow protocol module 1255 may translate the configuration information into information that the flow processor 1260 can understand. In some embodiments, the OpenFlow protocol module 1255 is a library that the OVS daemon 1250 accesses for some or all of the functions described above.

The flow processor 1260 manages the rules for processing and forwarding packets. For instance, the flow processor 1260 stores rules (e.g., in a storage medium, such as a disc drive) that the flow processor 1260 receives from the OpenFlow protocol module 1255, which the OpenFlow protocol module 1255 receives from the network controller 1225. In some embodiments, the rules are stored as a set of flow tables that each includes a set of flow entries (also referred to collectively as configured flow entries). The flow entries specify operations for processing and/or forwarding network data (e.g., packets) based on forwarding criteria. In addition, when the flow processor 1260 receives commands from the OpenFlow protocol module 1255 to remove rules, the flow processor 1260 removes the rules.

The proxy daemon 1265 is an application that runs in the pool node 1215. The proxy daemon 1265 functions as a proxy network controller cluster for the extenders in the remote sites. That is, the proxy daemon 1265 receives commands from the network controller 1225 regarding operations for processing and forwarding packets that the extenders receive. The proxy daemon relays the commands to the extenders through the NICs 1245 using the pool node network stack 1230. In some embodiments, the proxy daemon 1265 communicates with the network controller 1225 and the extenders in the remote sites using the OpenFlow protocol. Since the proxy daemon operates like a network controller for the extenders at the remote sites, the network controller 1225, which actually generates the commands, does not have to directly interface with the extenders, thereby hiding the IP address of the controller from the extenders.

In some embodiments, each NIC in the set of NICs 1245 is typical network interface controllers for connecting a computing device to one or more networks and sending and receiving network data (e.g., packets) over such networks. In addition, the set of NICs 1245 sends and receives network data from the pool node network stack 1230.

In some embodiments, the pool node network stack 1230 is an IP network stack that runs on the pool node 1215. Also, the pool node network stack 1230 processes and routes IP packets that are received from the patch bridge 1235 and the set of NICs 1245, by utilizing a set of forwarding tables (not shown) to forward the packets.

In some embodiments, the patch bridge 1235 stores a set of rules (e.g., flow entries) that specify operations for processing and forwarding packets. The patch bridge 1235 communicates with the OVS daemon 1250 in order to process and forward packets that the patch bridge 1235 receives. For instance, the patch bridge 1235 receives commands, from the network controller 1225 via the OVS daemon 1250, related to processing and forwarding of packets that the pool node 1215 receives.

As mentioned above, a pool node of some embodiments is responsible for processing packets that managed edge forwarding elements in the multi-tenant site cannot process. In this example, the patch bridge 1235 processes and forwards such packets. The patch bridge 1235 receives packets from the managed forwarding elements through the set of NICs 1245 and the pool node network stack 1230. When the patch bridge 1235 receives a packet, the patch bridge 1235 processes and forwards the packet according to the set of rules stored in the patch bridge 1235. In some cases, the patch bridge 1235 cannot process a packet (e.g., the patch bridge 1235 does not have a rule to which the packet matches). In these cases, the patch bridge 1235 sends the packet to the root bridge 1240 for processing.

The root bridge 1240 is responsible for a learning function. The root bridge 1240 of some embodiments stores a set of tables of learned MAC addresses. The root bridge 1240 learns MAC addresses in the typical manner that layer 2 switches learn MAC addresses. For instance, when the root bridge 1240 does not know a MAC address (i.e., a destination MAC address of a packet is not included in the set of tables of learned MAC addresses), the root bridge 1240 floods all of the ports of the root bridge 1240 and records the MAC address of the packet that responds to the flood in the set of tables. Although FIG. 12 illustrates a pool node that includes a root bridge, some embodiments may not include a root bridge. In some of these embodiments, the functions described above are implemented in the patch bridge of the pool node.

As shown in the right portion of FIG. 12, the extender 1220 includes a kernel and a user space. The user space of the extender 1220 includes the OVS daemon 1270. Other applications (not shown) may be included in the user space of the extender 1220 as well. The OVS daemon 1270 is an application that runs in the background of the user space of the extender 1220. The OVS daemon 1270 of some embodiments communicates with the pool node 1215, specifically the proxy daemon 1265 of the pool node 1215, in order to process and route packets that the extender 1220 receives. The OVS daemon 1270 is similar to the OVS daemon 1250 otherwise.

The OVS daemon 1270 includes an OpenFlow protocol module 1275 and a flow processor 1280. The OpenFlow protocol module 1275 communicates with the proxy daemon 1265 through the OpenFlow protocol. The flow processor 1280 manages the rules for processing and forwarding packets. For instance, the flow processor 1280 stores rules (e.g., in a storage medium, such as a disc drive) that the flow processor 1280 receives from the OpenFlow protocol module 1275, which, in some cases, the OpenFlow protocol module 1275 receives from the proxy daemon 1265. In some embodiments, the rules are stored as a set of flow tables that each includes a set of flow entries (also referred to collectively as configured flow entries). As noted above, flow entries specify operations for processing and/or forwarding network data (e.g., packets) based on forwarding criteria. In addition, when the flow processor 1280 receives commands from the OpenFlow protocol module 1275 to remove rules, the flow processor 1280 removes the rules.

In some embodiments, the flow processor 1280 supports different types of rules. For example, the flow processor 1280 of such embodiments supports wildcard rules and exact match rules. In some embodiments, an exact match rule is defined to match against every possible field of a particular set of protocol stacks. A wildcard rule is defined to match against a subset of the possible fields of the particular set of protocol stacks. As such, different exact match rules and wildcard rules may be defined for different set of protocol stacks.

The flow processor 1280 handles packets for which an integration bridge 1285 does not have a matching rule. For example, the flow processor 1280 receives packets from the integration bridge 1285 that does not match any of the rules stored in the integration bridge 1285. In such cases, the flow processor 1280 matches the packets against the rules stored in the flow processor 1280, which include wildcard rules as well as exact match rules.

In some embodiments, the flow processor 1280 may not have a rule to which the packet matches. In such cases, the flow process 1280 of some embodiments sends the packet to the proxy daemon 1265 (through the OpenFlow protocol module 1275). However, in other cases, the flow processor 1280 may have received from the proxy daemon 1260 a catchall rule that drops the packet when a rule to which the packet matches does not exist in the flow processor 1280.

After the flow processor 1280 generates the exact match rule based on the wildcard rule to which the packet originally matched, the flow processor 1280 sends the generated exact match rule and the packet to the integration bridge 1285 for the integration bridge 1285 to process. This way, when the integration bridge 1285 receives a similar packet that matches the generated exact match rule, the packet will be matched against the generated exact match rule in the integration bridge 1285 so the flow processor 1280 does not have to process the packet.

In some embodiments, the OVS kernel module 1295 includes a PIF bridge for each NIC. For instance, if the extender 1220 includes four NICs, the OVS kernel module 1295 would include four PIF bridges for each of the four NICs in the extender 1220. In other embodiments, a PIF bridge in the OVS kernel module 1295 may interact with more than one NIC in the extender 1220.

The PIF bridges 1296 and 1297 route network data between the extender network stack 1290 and network hosts external to the extender 1220 (i.e., network data received through the NICs 1298 and 1299). As shown, the PIF bridge 1296 routes network data between the extender network stack 1290 and the NIC 1298 and the PIF bridge 1297 routes network data between the extender network stack 1290 and the NIC 1299. The PIF bridges 1296 and 1297 of some embodiments perform standard layer 2 packet learning and forwarding.

In some embodiments, the extender 1220 provides and controls the PIF bridges 1296 and 1297. However, the network controller 1225 may, in some embodiments, control the PIF bridges 1296 and 1297 (via the proxy daemon 1265 and the OVS daemon 1270) in order to implement various functionalities (e.g., quality of service (QoS)) of the software forwarding element. More details on the flow processor and the OVS kernel module of an extender are described in the U.S. Patent Publication No. 2013/0058250, which is incorporated herein by reference.

Figure 13:
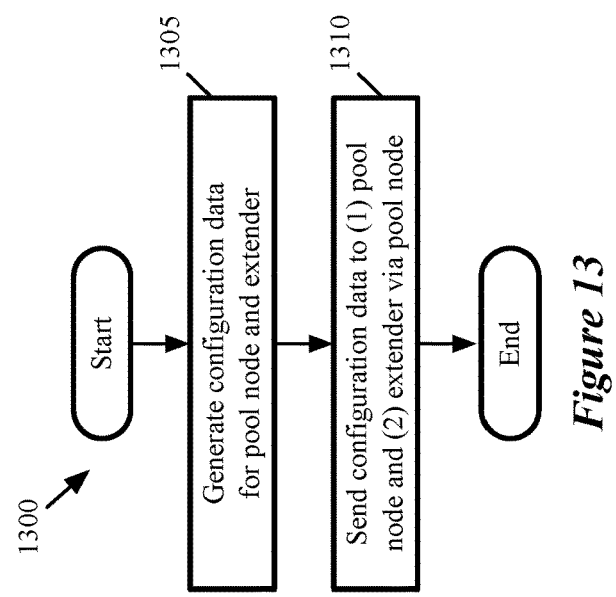
FIG. 13 conceptually illustrates a process that some embodiments perform to configure a pool node in a multi-tenant site and an extender at a remote site of a tenant.

FIG. 13 conceptually illustrates a process 1300 that some embodiments perform to configure a pool node in a multi-tenant site and an extender at a remote site of a tenant. In some embodiments, the process 1300 is performed by a network controller (e.g., the network controllers 130 and 810) that manages the managed forwarding elements of the multi-tenant site.

The process 1300 begins by generating (at 1305) configuration data (e.g., flow entries) for the pool node and the extender. In some embodiments, the process 1300 generates the configuration data based on the information that is gathered from the pool node and the extender. For instance, the process 1300 receives information about the host in which the extender runs and generates configuration data for the pool node for directing the pool node to establish a tunnel with the extender at the remote site. In some embodiments, the configuration data are formatted to conform to certain communication protocol (e.g., OpenFlow) so that the pool node and the extender that support the protocol can understand and process the data. Formatting the configuration data are described in greater detail below in Subsection II.B.

Next, the process 1300 sends (at 1310) the generated data for the pool node to the pool node and the generated data for the extender to the pool node in order to send the configuration data for the extender to the extender via the pool node. In some embodiments, the process 1300 sends the configuration data to the pool node without separating the data for the pool node from the data for the extender. In some such embodiments, the process 1300 puts identifiers in the data that indicate the network elements that should take a particular piece of data. These identifiers are capable of specifying (1) whether the data is for a pool node or an extender and (2) which extender in which remote site should receive the data.

In other embodiments, the process 1300 separates the data for the pool node from the data for the extender and sends the separated data to the pool node in separate communication channels. In some such embodiments, the pool node runs two daemons (e.g., the proxy daemon 1265 and the OVS daemon 1250 described above by reference to FIG. 12) for receiving and processing the data for the pool node and the data for the extender. In these embodiments, the network controller also puts identifiers in the data for an extender so that the pool node can determine the extender (and the remote site) to which the pool node should send the data. The pool node then configures the pool node based on the received data for the pool node and relays the received data for the extender to the extender. The process 1300 then ends.

Figure 14:
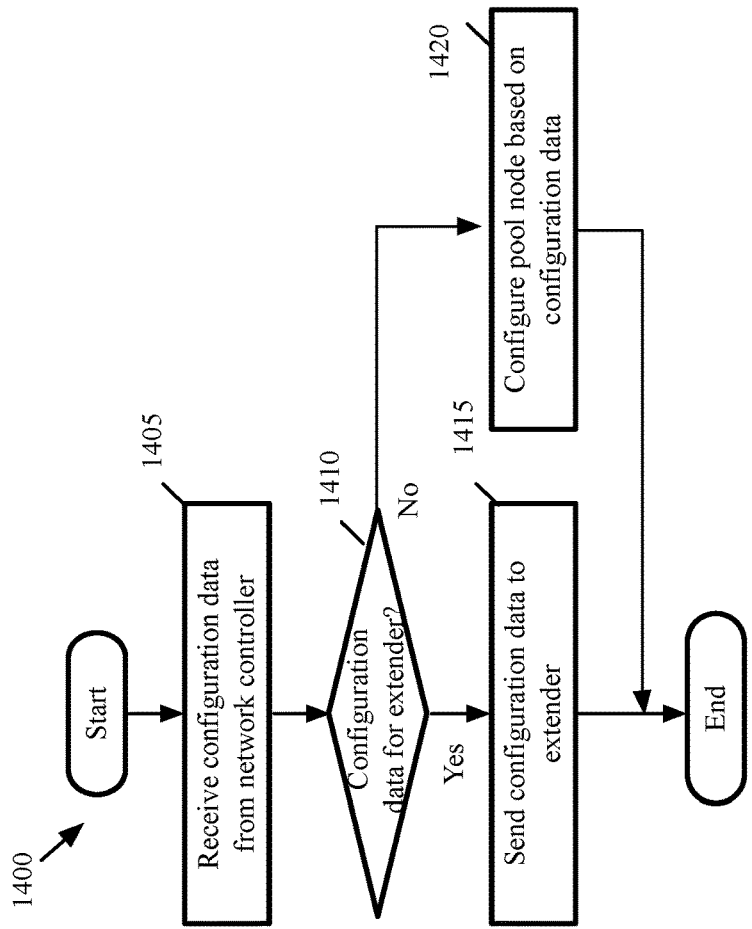
FIG. 14 conceptually illustrates a process that some embodiments perform to configure a pool node in a multi-tenant site and an extender at a remote site of a tenant.

FIG. 14 conceptually illustrates a process 1400 that some embodiments perform to configure a pool node in a multi-tenant site and an extender at a remote site of a tenant. In some embodiments, the process 1400 is performed by a pool node (e.g., the managed forwarding elements 135 and 830 and the pool node 1215) in the multi-tenant site. The process 1400 begins by receiving (at 1405) configuration data from a network controller operating in the multi-tenant site to manage the managed forwarding elements in the multi-tenant site.

Next, the process 1400 determines (at 1410) whether the received configuration data is for configuring the pool node or for configuring the extender. In some embodiments, the network controller sends the configuration data without separating the data for the pool node from the data for the extender. In some such embodiments, the network controller puts identifiers in the data that indicate the network elements that should take a particular piece of data. These identifiers are capable of specifying (1) whether the data is for a pool node or an extender and (2) which extender in which remote site should receive the data. In these embodiments, the process 1400 determines whether the received configuration data is for a pool node or for an extender based on the identifiers included in the received configuration data.

In some embodiments, the network controller separates the data for the pool node from the data for an extender and sends the separated data to the pool node in separate communication channels. In some such embodiments, the pool node runs two daemons (e.g., the proxy daemon 1265 and the OVS daemon 1250 described above by reference to FIG. 12) for receiving and processing the data for the pool node and the data for the extender. In these embodiments, the network controller also puts identifiers in the data for an extender so that the pool node can determine the extender to which the pool node should send the data. The process 1400 in these embodiments determines whether the received configuration data is for a pool node or for an extender based on the daemon that received the configuration data.

When the process 1400 determines (at 1410) that the received configuration data is not for an extender, the process 1400 proceeds to 1420 to configure the pool node based on the received configuration data. Otherwise, the process 1400 proceeds to 1415 to send the configuration data to an extender. The process 1400 of some embodiments identifies the extender to which to send the configuration data based on the identifiers that the network controller has included in the configuration data. The process 1400 sends the configuration data to the identified extender. The process then ends.

B. Generating Flow Entries

In some embodiments, a single layer of network controller (either a single network controller or a network controller cluster) communicates directly with the managed forwarding elements (e.g., the edge forwarding elements, the pool node(s), and the extender(s)). However, in other embodiments, several layers of network controllers process and generate flow entries in the network control system. For example, in some embodiments, each logical datapath set (i.e., each logical forwarding element) is assigned to a single logical (higher-level) network controller. This logical controller receives logical control plane (LCP) data and converts the LCP data into logical forwarding plane (LFP) data. The logical controller also subsequently converts the LFP data into universal physical control plane (UPCP) data.

In some embodiments, the UPCP data is published by the logical controller to a second level of network controller (referred to as a physical controller). In some embodiments, different physical controllers manage different physical forwarding elements (e.g., edge forwarding elements, pool nodes, gateways, etc.). Furthermore, the physical controller of some embodiments converts the UPCP data into customized physical control plane (CPCP) data. In other embodiments, however, the physical controller passes the UPCP data to a conversion mechanism operating at the forwarding element itself (referred to as a chassis controller).

The LCP data, in some embodiments, describes the logical network topology (e.g., as a set of bindings that map addresses to logical ports). In some embodiments, the LCP data is expressed as a set of database table records (e.g., in the nLog language). An entry in the control plane describing the attachment of a particular virtual machine to the network might state that a particular MAC address or IP address is located at a particular logical port of a particular logical switch. In some embodiments, the LFP data derived from the LCP data consists of flow entries described at a logical level. That is, a flow entry might specify that if the destination of a packet matches a particular IP address, to forward the packet to the logical port to which the IP address is bound.

The translation from LFP to physical control plane (PCP) data, in some embodiments, adds a layer to the flow entries that enables a managed forwarding element provisioned with the flow entries to convert packets received at a physical layer port (e.g., a virtual interface) into the logical domain and perform forwarding in this logical domain. That is, while traffic packets are sent and received within the network at the physical layer, the forwarding decisions are made according to the logical network topology entered by the user. The conversion from the LFP to the PCP enables this aspect of the network in some embodiments.

As mentioned, the logical controller converts the LFP data into the UPCP, which is subsequently converted to CPCP data. The UPCP data of some embodiments is a data plane that enables the control system of some embodiments to scale even when it contains a large number of managed forwarding elements (e.g., thousands) to implement a logical datapath set. The UPCP abstracts common characteristics of different managed forwarding elements in order to express PCP data without considering differences in the managed forwarding elements and/or location specifics of the managed forwarding elements. The UPCP to CPCP translation involves a customization of various data in the flow entries. While the UPCP entries are applicable to any managed forwarding element because the entries include generic abstractions for any data that is different for different forwarding elements, the CPCP entries include substituted data specific to the particular managed forwarding element to which the entry will be sent (e.g., specific tunneling protocols, virtual and physical interface, etc.).

Figure 15:
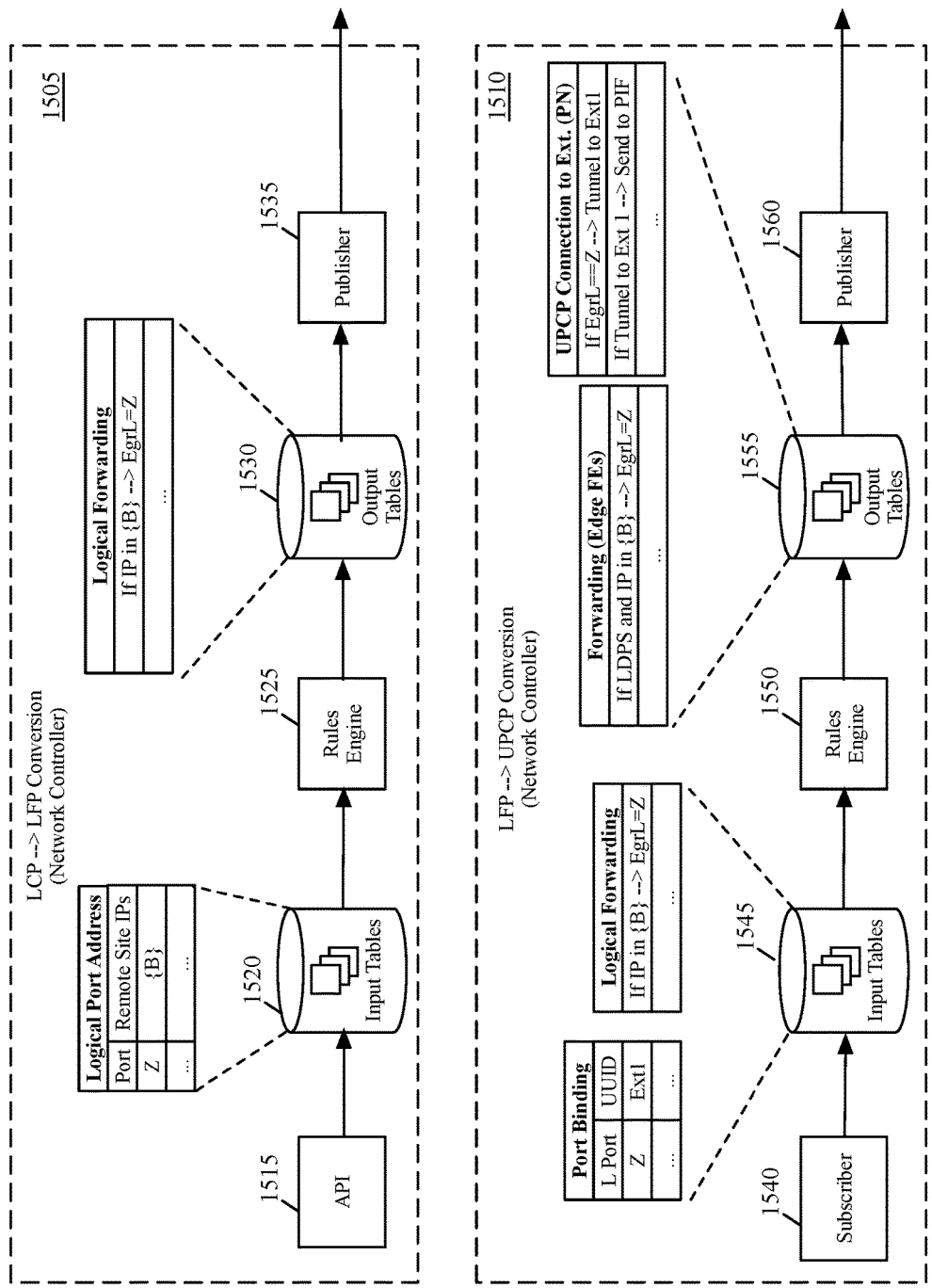
FIG. 15 conceptually illustrates a conversions from logical control plane data to universal physical control plane data performed at a logical controller of some embodiments.

FIG. 15 conceptually illustrates the conversions from LCP data to UPCP data performed at the logical controller of some embodiments, by showing input and output tables for each of these conversions. In some embodiments, these input and output tables are nLog tables. In some embodiments, the LCP to LFP conversion is performed by a control application, while the LFP to UPCP conversion is performed by a virtualization application. As shown, the control application 1505 includes an application programming interface (API) 1515, input tables 1520, a rules engine 1525, output tables 1530, and a publisher 1535.

The API 1515 provides an interface for translating input into the control plane input tables 1520. This API 1515 may be used by various types of management tools with which a user (e.g., a network administrator for a particular tenant) can view/and or modify the state of a logical network (in this case, the logical network that spans both the data center and the tenant's remote site). In some embodiments, the management tools provide a user interface such as a graphical user interface that allows a visual configuration of port bindings, ACL rules, etc. (e.g., through a web browser). Alternatively, or in conjunction with the graphical user interface, some embodiments provide the user with a command line tool or other type of user interface.

Based on the information received through the API, as well as updates to the network state received from the managed forwarding elements (not shown), the control application generates the input tables 1520. The input tables represent the state of the logical forwarding elements managed by the user in some embodiments. As shown in this figure, some of the input tables 1520 include the bindings of IP addresses with logical ports of the logical forwarding element. In some embodiments, the input tables to the LCP to LFP conversion may include bindings of MAC addresses with logical ports (for L2 logical forwarding), as well as ACL rules set by the user. In this case, the logical Port Z is associated with the remote site machines, which include a set of IP addresses {B}. Because multiple different machines at the remote site are associated with a single port of the logical forwarding element, the port is bound to a set of IP addresses.

The rules engine 1525 of some embodiments performs various combinations of database operations on different sets of input tables 1520 to populate and/or modify different sets of output tables 1530. As described in further detail in U.S. Patent Publication 2013/0058350, incorporated herein by reference, in some embodiments the rules engine is an nLog table mapping engine that maps a first set of nLog tables into a second set of nLog tables. The output tables 1530 populated by the rules engine 1525 include logical forwarding plane lookups (e.g., mapping the set of IP addresses to a destination output port).

The publisher 1535 is also described in further detail in U.S. Patent Publication 2013/0058350, and publishes or sends the output tables 1530 to the virtualization application 1510, in order for this application to use the output tables 1530 among its input tables. In some embodiments, the publisher 1535 also outputs the tables to a data structure (e.g., a relational database) that stores network state information.

The virtualization application 1510 receives the output tables 1530 (LFP data) of the control application 1505, and converts this data to UPCP data. As shown, the virtualization application 1510 includes a subscriber 1540, input tables 1545, a rules engine 1550, output tables 1555, and a publisher 1560. The subscriber 1540 of some embodiments is responsible for retrieving tables published by the publisher 1535. In some embodiments, the subscriber 1540 retrieves these tables from the same data structure to which the publisher stores the table information. In other embodiments, a change in the tables is detected by the conversion modules in order to initiate the processing.

The input tables 1530 include, in some embodiments, at least some of the output tables 1530, in addition to other tables. As shown, in addition to the logical forwarding plane data generated by the control application 1505, the input tables 1545 include additional port binding information (matching logical ports with the universally unique identifier (UUID) of particular source or destination managed forwarding elements).

In some embodiments, the rules engine 1550 is the same as the rules engine 1525. That is, the control application 1505 and the virtualization application 1510 actually use the same rules engine in some embodiments. As indicated, the rules engine performs various combinations of database operations on different sets of input tables 1545 to populate and/or modify different sets of output tables 1555. In some embodiments, the rules engine is an nLog table mapping engine that maps a first set of nLog tables into a second set of nLog tables.

The output tables 1555 populated by the rules engine 1550 include different lookup entries for different managed forwarding elements. For instance, in some embodiments that perform all logical processing at the first hop (i.e., the edge forwarding element), the physical control plane entries implementing the logical forwarding element will be sent to the edge forwarding elements that might receive a packet destined for one of the machines at the remote tenant site without logical context and need to be able to perform logical forwarding to send the packet to the remote tenant site. Thus, the output tables 1555 include an entry mapping the set of IP addresses {B} to the logical egress port Z when the particular logical datapath set for the tenant is matched. In addition, the UPCP will include entries for mapping the logical egress port to a physical port through which to send the packet (with port abstractions so that the same entry can be sent to numerous edge forwarding elements).

The output tables also include entries for the non-first hop forwarding elements, such as the pool nodes and the remote gateways. In this case, two UPCP entries are generated for the pool node in order to send packets to the extender. Specifically, as shown, the UPCP entries include an entry to send via a tunnel to Ext1 when the logical egress port matches Port Z, and then if sending via a tunnel to Ext1, to send to a particular physical interface. Because these are UPCP entries, the particular data about the tunnel and the physical interface are not filled in, but are instead left as abstractions. A UUID (in some embodiments, discovered from the remote gateway) is used in the input tables 1545 and then added to the flow entries in the output tables 1555 to identify the tunnel endpoint. Thus, even if multiple extenders of multiple tenants have the same tunnel endpoint IP addresses, the UUID serves to disambiguate the flows.

The publisher 1560 is similar to the publisher 1535 in some embodiments. The publisher 1560 publishes and/or sends the output tables 1555 to the physical controllers. In some cases, certain flow entries (e.g., the entry shown for the edge forwarding elements) may be sent to multiple different physical controllers while other entries are sent to only one physical controller. In some embodiments, the publisher 1560 outputs the tables to a data structure (e.g., a relational database) that stores network state information.

Figure 16:
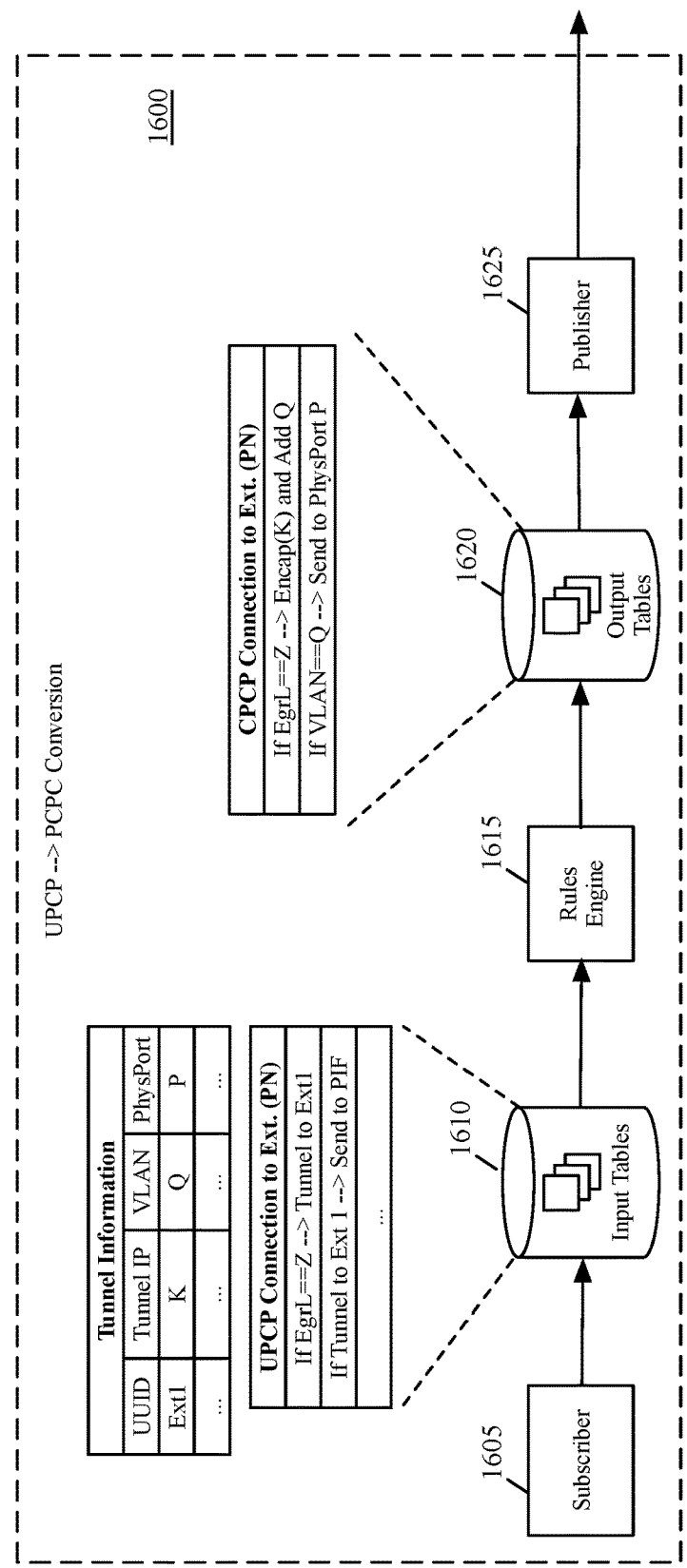
FIG. 16 conceptually illustrates a subsequent universal physical control plane to customized physical control plane conversion performed at either a physical controller or chassis controller of some embodiments.

FIG. 16 conceptually illustrates the subsequent UPCP to CPCP conversion performed at either the physical controller or chassis controller. The conversion application 1600 receives the output tables 1560 (UPCP data) of the virtualization application 1505, and converts this data to CPCP. As shown, the conversion application 1600 includes a subscriber 1605, input tables 1610, a rules engine 1615, output tables 1620, and a publisher 1625. The subscriber 1605 of some embodiments is responsible for retrieving tables published by the publisher 1560 of the logical controller. In some embodiments, the subscriber 1605 retrieves these tables from the same distributed data structure to which the publisher stores the table information. In other embodiments, a change in the tables is detected by the conversion modules based on information sent from the logical controller in order to initiate the processing. In some embodiments, only the UPCP entries to be sent to the particular managed forwarding elements that a given physical controller manages will be received at that given physical controller.

The input tables 1610 include, in some embodiments, at least some of the output tables 1555, in addition to other tables. In addition to the UPCP data generated by the virtualization application 1510, the input tables 1610 include tunnel information that matches the UUID Ext1 to a tunnel IP, a virtual interface (in this case using the VLAN Q), and a physical port P of the pool node. Because this conversion is performed at either the physical controller that manages the extender, or at the chassis controller at the extender itself, the input tables may not include the entry for performing logical forwarding. In addition, this entry is not modified by the UPCP to CPCP conversion, because no customization information (e.g., physical ports, tunnel endpoints, etc.) is required for the entry.

In some embodiments, the rules engine 1615 is the same type of engine as that used by the control and virtualization applications at the logical controller. As indicated, the rules engine performs various combinations of database operations on the different sets of input tables 1610 to populate and/or modify different sets of output tables 1620. In some embodiments, the rules engine is an nLog table mapping engine that maps a first set of nLog tables into a second set of nLog tables.

The output tables 1620 populated by the rules engine 1615 include the customized physical control plane entries. As illustrated, the physical control plane entries now include the customized information. Specifically, the first entry indicates that if the egress context specifies the logical port Z, to take the action of encapsulating the packet with the tunnel IP address, and subsequently to add the VLAN tag Q. As described above, the VLAN tag (or, e.g., GRE information or other virtual interface tagging) enables packets for multiple different tenants to be sent to different VRFs at the same provider edge router. Furthermore, the CPCP entries map the VLAN tag Q to a particular physical port of the pool node (i.e., the physical interface virtualized by the VLANs.

One of ordinary skill in the art will recognize that the input and output tables shown in this figure are simplified conceptual representations of the actual tables, which are generated in a database language appropriate for the rules engine (e.g., nLog) and may provide additional information to that shown. Furthermore, different embodiments will use different sets of tables. For instance, in addition to the entries for outgoing packets over the tunnel, corresponding entries for incoming packets received over the tunnel and VLAN will be required at the pool node. In addition, similar entries for establishing the tunnel (though not the VLAN) at the extender are required.

IV. Use Cases

Figure 17:
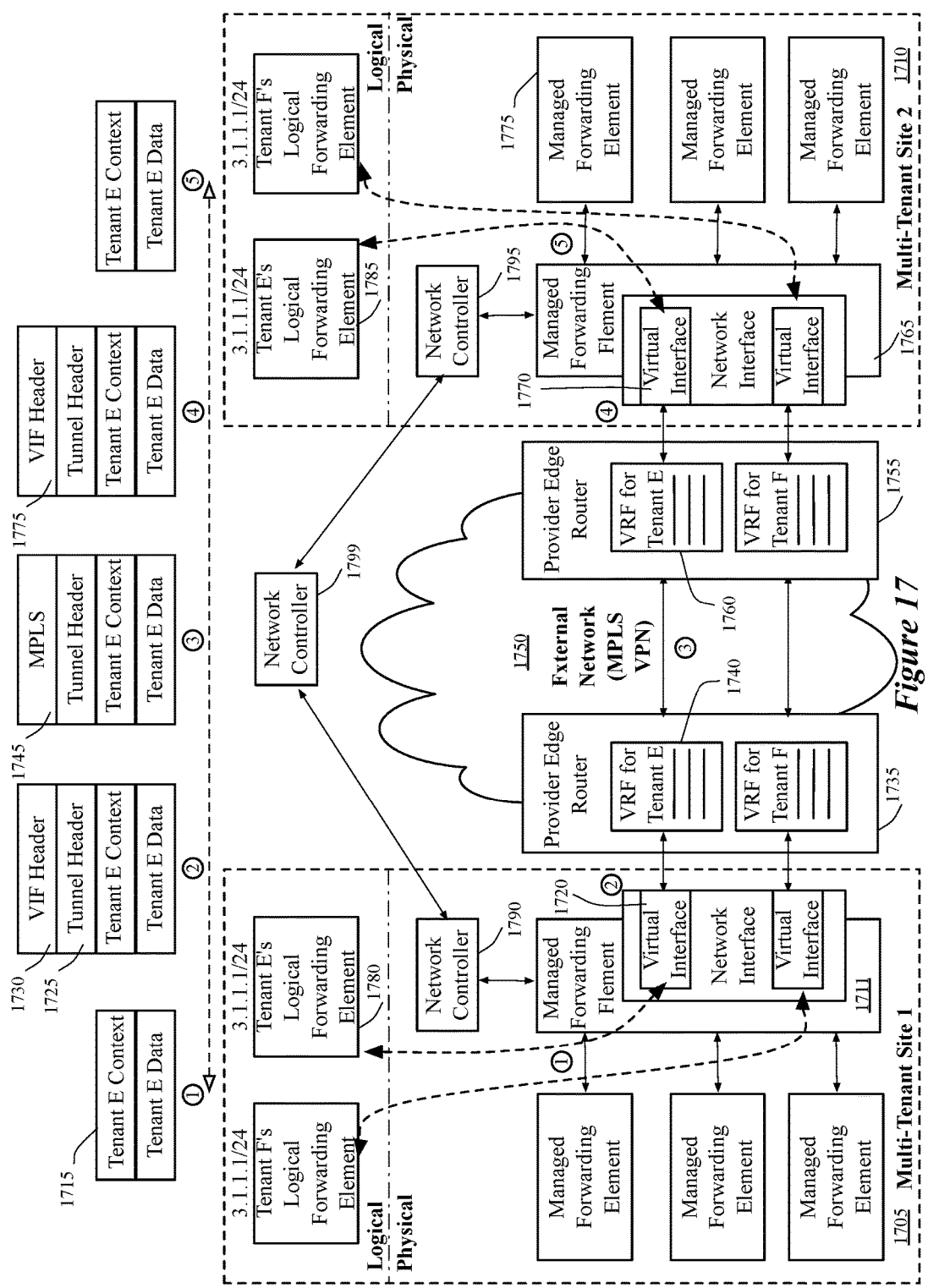
FIG. 17 illustrates how the data that originates from a machine of a particular tenant in a first multi-tenant site is forwarded to a machine of the particular tenant in a second multi-tenant site.

The following section will describe extending logical networks in a multi-tenant site into another multi-tenant site. FIG. 17 illustrates how the data that originates from a machine of a particular tenant in a first multi-tenant site is forwarded to a machine of the particular tenant in a second multi-tenant site. Specifically, this figures illustrates data exchange between a machine (not shown) of tenant E in a multi-tenant site 1705 and a machine (not shown) of the tenant E in a multi-tenant site 1710 in both directions of the exchange.

In addition to the two multi-tenant sites 1705 and 1710, this figure illustrates an external network 1750 that employs the MPLS VPN technology. Also, the top portion of the figure shows a data packet 1715 as the packet is forwarded through different parts of the network. The different parts of the network are depicted using encircled numbers 1-5.

Each of the multi-tenant sites 1705 and 1710 is similar to the multi-tenant site 105 described above in that the managed forwarding elements in the multi-tenant site 1705 or 1710 implement several logical forwarding elements. Moreover, the machines of a tenant in both multi-tenant sites are in the same address space. Because the data exchange is between two multi-tenant sites rather than between a multi-tenant site and a remote private site, the tunnels are established between two pool nodes rather than between a pool node and an extender in some embodiments. Also, each of the pool nodes creates VIFs for connecting to the VRFs for the tenants.

Forwarding of the packet 1715 for the tenant E from a source machine (not shown) in the multi-tenant site 1705 to the destination machine in the multi-tenant site 1710 will now be described. Because the forwarding of a packet in the opposite direction will show an identical sequence, only the packet traversal in one direction will be described. At the encircled 1, a managed forwarding element 1711 receives the data packet 1715. The data packet 1715 of some embodiments has tenant E's context, which includes the header fields and the logical context of the packet. The managed forwarding element 1711 determines that the data packet 1715 belongs to the tenant E based on the logical context of the packet. The managed forwarding element 1711 also determines that the logical egress port for this packet maps to a physical port of a managed forwarding element in the multi-tenant site 1710. The managed forwarding element 1711 thus identifies a VIF 1720 as the physical port through which the packet should be forwarded out.

At the encircled 2, the managed forwarding element 1711 attaches a tunnel header 1725 and then a VIF header 1730. A PE router 1735 that interfaces with the multi-tenant site 1705 receives the packet and uses the VRF 1740 that is associated with the tenant E. At the encircled 3, the PE router 1740 removes the VIF header 1730 and attaches an MPLS header 1745 so that the forwarding elements (not shown) in an external network 1750 forward the packet 1715 to a PE router 1755 that interfaces with the multi-tenant site 1710.

The PE router 1755 removes the MPLS header 1745 from the packet 1715 and looks at the tunnel header 1725. Based on the information included in the tunnel header 1725, the PE router 1755 determines that a VRF 1760 of the PE router 1755 should be used to forward the packet. The VRF 1760 directs the PE router 1755 to forward the packet to a managed forwarding element 1765, which is configured to function as a pool node, via a VIF 1770 of the managed forwarding element 1765. Thus, the PE router 1755 attaches a VIF header 1775 to the packet at the encircled 4.

The managed forwarding element 1765 receives the packet and identifies that the packet belongs to the tenant E because the packet comes through the VIF 1770. The managed forwarding element 1765 also looks at the logical context of the packet and identifies the destination machine of the packet. At the encircled 5, the managed forwarding element 1765 removes the VIF header 1775 and the tunnel header 1725 and sends the packet 1715 to the managed forwarding element 1775 because the destination machine (not shown) for the packet 1715 is directly interfacing with the managed forwarding element 1775.

In some embodiments, the pool nodes of the two multi-tenant sites do not establish a tunnel between them. In some such embodiments, the PE routers interfacing the multi-tenant states will look at the logical context of the packet and identifies the destination of the packet from the logical context of the a packet.

With or without the tunnel between the two pool nodes 1711 and 1765, a logical forwarding element 1780 of the tenant E in the multi-tenant site 1705 and a logical forwarding element 1785 of the tenant E in the multi-tenant site 1710 are not different logical forwarding elements because both logical forwarding elements handle the same address space. In other words, there effectively is one logical forwarding element for the tenant E that is implemented by the managed forwarding elements in both multiple-tenant sites 1705 and 1710.

In some embodiments, a network controller at each multi-tenant site configures the pool node in the multi-tenant site. The controller does not have to configure a remote extender via the pool node but the network controller in some embodiments communicates with the network controller in the other multi-tenant site in order to configure the pool nodes to effectuate the data exchange between the two multi-tenant sites.

In some embodiments, network controllers 1790 and 1795 do not use the links established between the two pool nodes 1711 and 1765 in the two multi-tenant sites 1705 and 1710 for exchanging data traffic. Instead, the network controllers 1790 and 1795 of some embodiments may open a direct communication channel to exchange configuration information.

Instead of having the two network controllers 1790 and 1795 communicate with each other horizontally, some embodiments use a cloud management system as a single point of control to communicate with both of the network controllers 1790 and 1795. In other embodiments, a higher-level network controller 1799 provides a higher-level control policy (and higher-level logical datapath set) to the network controllers 1790 and 1795 so that these two controllers implement the policy in their respective sites. Also, any communication between the network controllers 1790 and 1795 takes place through the higher-level controller 1799. This high-level controller 1799 may be operating in either of the two multi-tenant sites 1705 and 1710 or in a third site. Alternatively or conjunctively, an administrator for the tenant E may configure the pool nodes 1711 and 1765 using the network controllers 1790 and 1795 in some embodiments.

V. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 18:
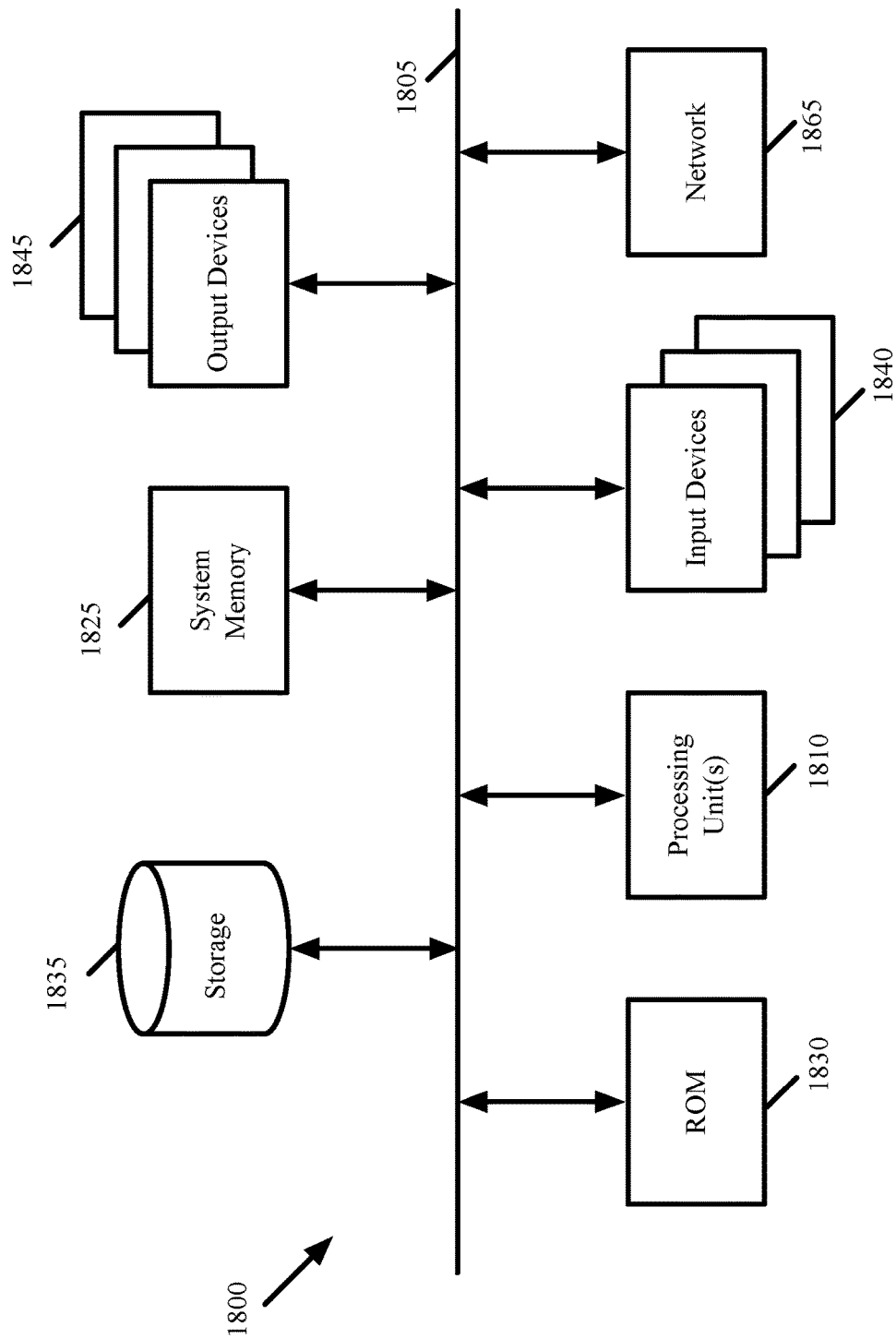
FIG. 18 conceptually illustrates a computer system with which some embodiments of the invention are implemented.

FIG. 18 conceptually illustrates an electronic system 1800 with which some embodiments of the invention are implemented. The electronic system 1800 can be used to execute any of the control, virtualization, or operating system applications described above. The electronic system 1800 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1800 includes a bus 1805, processing unit(s) 1810, a system memory 1825, a read-only memory 1830, a permanent storage device 1835, input devices 1840, and output devices 1845.

The bus 1805 collectively represents all system, peripheral, and chipset buses that communicatively connect the numerous internal devices of the electronic system 1800. For instance, the bus 1805 communicatively connects the processing unit(s) 1810 with the read-only memory 1830, the system memory 1825, and the permanent storage device 1835.

From these various memory units, the processing unit(s) 1810 retrieve instructions to execute and data to process in order to execute the processes of the invention. The processing unit(s) may be a single processor or a multi-core processor in different embodiments.

The read-only-memory (ROM) 1830 stores static data and instructions that are needed by the processing unit(s) 1810 and other modules of the electronic system. The permanent storage device 1835, on the other hand, is a read-and-write memory device. This device is a non-volatile memory unit that stores instructions and data even when the electronic system 1800 is off. Some embodiments of the invention use a mass-storage device (such as a magnetic or optical disk and its corresponding disk drive) as the permanent storage device 1835.

Other embodiments use a removable storage device (such as a floppy disk, flash drive, etc.) as the permanent storage device. Like the permanent storage device 1835, the system memory 1825 is a read-and-write memory device. However, unlike storage device 1835, the system memory is a volatile read-and-write memory, such a random access memory. The system memory stores some of the instructions and data that the processor needs at runtime. In some embodiments, the invention's processes are stored in the system memory 1825, the permanent storage device 1835, and/or the read-only memory 1830. From these various memory units, the processing unit(s) 1810 retrieve instructions to execute and data to process in order to execute the processes of some embodiments.

The bus 1805 also connects to the input and output devices 1840 and 1845. The input devices enable the user to communicate information and select commands to the electronic system. The input devices 1840 include alphanumeric keyboards and pointing devices (also called "cursor control devices"). The output devices 1845 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 18, bus 1805 also couples electronic system 1800 to a network 1865 through a network adapter (not shown). In this manner, the computer can be a part of a network of computers (such as a local area network ("LAN"), a wide area network ("WAN"), or an Intranet, or a network of networks, such as the Internet. Any or all components of electronic system 1800 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 6, 7, 10, 11, 13, and 14) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

What is claimed is:

1. A method for managing a plurality of tenant networks spanning a plurality of physical sites, the method comprising:
    configuring a particular managed forwarding element (MFE) executing on a particular host computer at a multi-tenant site (i) to implement a first logical forwarding element (LFE) with a first set of MFEs executing on a first set of host computers and (ii) to implement a second LFE with a second set of MFEs executing on a second set of host computers, the first LFE for forwarding packets for a first tenant network and the second LFE for forwarding packets for a second tenant network, the first and second LFEs comprising first and second logical ports, said configuring comprising configuring the particular MFE to map the first logical port to a first extender MFE at a first tenant site associated with the first tenant network and map the second logical port to a second extender MFE at a second tenant site associated with the second tenant network;
    forwarding a first packet associated with the first tenant network to the first tenant site by using the first LFE and the first logical port to forward the first packet to the first extender; and
    forwarding a second packet associated with the second tenant network to the second tenant site by using the second LFE and the second logical port to forward the second packet to the second extender.

2. The method of claim 1, wherein forwarding the first and second packets to the first and second tenant sites comprises tunneling packets across a wide area network (WAN).

3. The method of claim 1, wherein said configuring the particular MFE to map the first logical port to the first extender MFE comprises configuring the particular MFE to map the first logical port to a first virtual interface (VIF) for tunneling packets of the first tenant network to the first extender MFE at the first tenant site, and said configuring the particular MFE to map the second logical port to the second extender MFE comprises configuring the particular MFE to map the second logical port to a second VIF for tunneling packets of the second tenant network to the second extender MFE at the second tenant site.

4. The method of claim 3, wherein the first tenant network is associated with a first tenant identifier and the second tenant network is associated with a second tenant identifier, the method further comprising using the first tenant identifier to establish a first tunnel with the first extender MFE and using the second tenant identifier to establish a second tunnel with the second extender MFE.

5. The method of claim 4, wherein a provider edge router associates a first VPN routing and forwarding (VRF) table for the first tenant network with the first identifier and a second VRF table for the second tenant network with the second identifier.

6. The method of claim 1, wherein the first tenant network uses a first address space and the second tenant network uses a second address space, wherein the first and second address spaces partially overlap.

7. The method of claim 1, wherein at least one common host computer belongs to both the first set of host computers and the second set of host computers, and the first and second LFEs span over an MFE executing on the common host computer.

8. The method of claim 1 wherein said configuring the particular MFE is performed by at least one network controller.

9. The method of claim 8 wherein the network controller configures a particular set of MFEs to implement a particular LFE with a plurality of logical ports, by mapping the plurality of logical ports of the particular LFE to a plurality of managed ports of the particular set of MFEs.

10. A method for managing a multi-tenant site comprising a plurality of host computers executing managed forwarding elements (MFEs) that forward data in the multi-tenant site, the method comprising:
    configuring a first plurality of MFEs to implement a first logical forwarding element (LFE) that (i) spans the first plurality of MFEs and (ii) forwards data for a first set of machines having addresses in a first address space;
    configuring a second plurality of MFEs to implement a second LFE that (i) spans the second plurality of MFEs and (ii) forwards data for a second set of machines having addresses in a second address space; and
    configuring a particular MFE that belongs to both the first and second pluralities of MFEs to forward data to a first tenant site at a first geographic location using the first address space and a second tenant site at a second different geographic location using the second address space.

11. The method of claim 10, wherein forwarding data to the first and second tenant sites comprises tunneling data across a wide area network (WAN).

12. The method of claim 10, wherein the first address space and the second address space at least partially overlap.

13. The method of claim 12, wherein the first tenant network is associated with a first tenant identifier and the second tenant network is associated with a second tenant identifier.

14. The method of claim 13, wherein the first tenant site comprises a first extender MFE and the second tenant site comprises a second extender MFE, wherein the particular MFE uses the first tenant identifier to establish a first tunnel with the first extender MFE and the second tenant identifier to establish a second tunnel with the second extender MFE.

15. The method of claim 10 wherein configuring the first and second pluralities of MFEs comprises configuring at least one MFE to perform mapping operations between physical network attributes and logical network attributes.

16. The method of claim 10 wherein configuring the first and second pluralities of MFEs comprises configuring at least one MFE to perform logical forwarding operations based on logical attributes of an LFE.

17. A non-transitory machine readable medium storing a program for managing a plurality of tenant networks spanning a plurality of physical sites, the program comprising sets of instructions for:
configuring a first plurality of managed forwarding elements (MFEs) executing on a first set of host computers at a first multi-tenant datacenter to implement a first logical forwarding element (LFE) and a second LFE; and
configuring a second plurality of MFEs executing on a second set of host computers at a second multi-tenant datacenter to implement the first LFE and the second LFE;
wherein the first LFE spans both the first and the second pluralities of MFEs, and the second LFE spans both the first and the second pluralities of MFEs;
wherein the first LFE is for forwarding packets for a first tenant network and the second LFE is for forwarding packets for a second tenant network.

18. The non-transitory machine readable medium of claim 17, wherein the first multi-tenant datacenter and the second multi-tenant datacenter are physically separated by a wide area network (WAN).

19. The non-transitory machine readable medium of claim 18, wherein a particular MFE in the first multi-tenant datacenter forwards packets to the second multi-tenant datacenter by tunneling data across the WAN.

20. The non-transitory machine readable medium of claim 17, wherein the first LFE comprises a first logical port that is mapped to a first virtual interface (VIF) at an MFE of the first multi-tenant datacenter for tunneling data of the first multi-tenant datacenter to the second multi-tenant datacenter.

21. The non-transitory machine readable medium of claim 17, wherein the first tenant network is associated with a first tenant identifier and the second tenant network is associated with a second tenant identifier.

22. The non-transitory machine readable medium of claim 21, wherein a provider edge router of the first multi-tenant datacenter associates a first VPN routing and forwarding (VRF) table for the first tenant network with the first identifier and a second VRF table for the second tenant network with the second identifier.

23. The non-transitory machine readable medium of claim 17, wherein the first tenant network uses a first address space and the second tenant network uses a second address space, wherein the first and second address spaces partially overlap.

24. The non-transitory machine readable medium of claim 17 wherein when an MFE implements an LFE for a tenant, the MFE performs logical forwarding operations based on a tenant-specific logical identifier associated with the implemented LFE for the tenant.

* * * * *